US007075867B2

(12) United States Patent
Watanabe et al.

(10) Patent No.: US 7,075,867 B2
(45) Date of Patent: Jul. 11, 2006

(54) OPTICAL DISC CONTROLLER AND OPTICAL DISC DEVICE HAVING THE SAME

(75) Inventors: Katsuya Watanabe, Nara (JP); Masanobu Takahashi, Takatsuki (JP); Akihiro Hatsusegawa, Kyoto (JP); Tatsuo Suzuki, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/502,674

(22) PCT Filed: Jan. 28, 2003

(86) PCT No.: PCT/JP03/00814

§ 371 (c)(1), (2), (4) Date: Jan. 6, 2005

(87) PCT Pub. No.: WO03/065368

PCT Pub. Date: Aug. 7, 2003

(65) Prior Publication Data

US 2005/0122874 A1 Jun. 9, 2005

(30) Foreign Application Priority Data

Jan. 29, 2002 (JP) ............................ 2002-019660

(51) Int. Cl.
*G11B 15/52* (2006.01)

(52) U.S. Cl. .................................. 369/47.3; 369/47.38

(58) Field of Classification Search ..................... None
See application file for complete search history.

(56) References Cited

U.S. PATENT DOCUMENTS 6,381,204 B1 * 4/2002 Kobayashi et al. ........ 369/47.3
6,992,958 B1 * 1/2006 Kudo et al. ................ 369/47.3
2002/0105365 A1 8/2002 Kudo et al.

FOREIGN PATENT DOCUMENTS

JP 2001-291309 A 10/2001
JP 2002-269752 A 9/2002

* cited by examiner

*Primary Examiner*—Paul W. Huber
(74) *Attorney, Agent, or Firm*—Akin Gump Strauss Hauer & Feld, LLP

(57) ABSTRACT

An optical disc controller for an optical disc drive playing optically a first information storage medium and a second information storage medium having a higher storage density than the first medium. The controller includes: a rotation control section for controlling a rotating mechanism rotating the media; an equalizer for removing first frequency range components from an RF playback signal, obtained by irradiating each media with light and detecting reflected light, and amplifying second frequency range components; and a phase locking section for generating a sync clock signal to do synchronization detection with a digital playback signal obtained by digitizing the output of the equalizer. The rotation control section rotates the media while controlling the rotating mechanism such that RF playback signals are obtained at first and second transfer rates. The maximum playback frequency of the RF playback signal obtained from the first medium at the first transfer rate is substantially equal to that of the RF playback signal obtained from the second medium at the second transfer rate.

22 Claims, 23 Drawing Sheets

11
Decoded Information
CD/DVD Demodulating
108
PLL
107
Register
110
114
Digitizing
106
Medium Selecting
PLL Setting
105
System Controller
111
Setting Storage Table
112
Equalizer
105
Register
109
Equalizer Setting
Disc Type Recognizing
141
Disc Motor Rotation Control
113
RF Amplifier
104
Optical Pickup
103
Laser 1
Laser 2
1021
1022
1023
102
Disc Motor
101

RF Amplifier
104
RF Signal
Bandpass Filter
201
Treble Boost Filter
202
Equalized RF Signal
105
Digitizing
106
Register
203
Cutoff Frequency Setting
Register
204
Degree-Of-Boost Setting
109
System Controller
111
Setting Storage Table
112

Digitizing
106
Digitized RF Signal
Phase Detector
301
Low Pass Filter
302
VCO
303
Frequency Divider
304
107
Sync Clock
Demodulating
108
Register
305
Register
306
VCO Setting
Frequency Division Ratio Setting
110
System Controller
111
Setting Storage Table
112

Number Of Revolutions (rpm)
7000
6000
5000
4000
3000
2000
1000
0
25
30
35
40
45
50
55
58
Radius (cm)
CD At 12x
CD At 6x
Single-Layer DVD
Two-Layer DVD
CD CD At 14.2x Max
Single-Layer DVD At 2.4x
Two-Layer DVD At 2.4x
Playback Speed (X)
16.0
14.0
12.0
10.0
8.0
6.0
4.0
2.0
0.0
25
30
35
40
45
50
55
Radial Location (mm)

*FIG. 8*

Setting Storage Table

| Address | Constants Stored |
|---|---|
| 1 | Cutoff Frequency (RF Signal Frequency : 18MHz～64MHz) |
| 2 | Degree Of Boost (RF Signal Frequency : 18MHz～64MHz) |
| 3 | VCO Gain (RF Signal Frequency : 18MHz～64MHz) |
| 4 | Frequency Division Ratio (RF Signal Frequency : 18MHz～64MHz) |

12
103
Optical Pickup
104
RF Amplifier
105
Equalizer
106
Digitizing
108
CD/DVD Demodulating
Decoded Information
109
Register
Medium Selecting
Equalizer Setting
PLL
1101
PLL Setting
Register
110
102
Disc Motor
Disc Motor Rotation Control
101
113
System Controller
111
Setting Storage Table
112
115

302
Low Pass Filter
1201
Reference Clock Generator
1301
VCO Gain 1
VCO Gain 2
VCO Gain 3
1302
1303
1202
1304
1305
$1/N_1$
$1/N_2$
$1/N_3$
Demodu-lating
108
305
Register
VCO Setting
Register
306
Frequency Division Ratio Setting
110
Setting Storage Table
112
System Controller
111

Sync Clock
1202
62.5MHz
250MHz
Frequency Divider
1/8
1502
1/2
1503
DVD At 2.3x
DVD At 9.3x
500MHz
1501
VCO 13
Traverse Motor
1601
Optical Pickup
103
RF Amplifier
104
Traverse Motor Control
1615
Equalizer
105
Digitizing
106
CD/DVD Demodulating
108
Decoded Information
Register
109
Equalizer Setting
Medium Selecting
PLL
1603
Location Sensor
1604
102
Disc Motor
101
Optical Pickup Position Detector
1602
Disc Motor Rotation Control
113
PLL Setting
Register
110
System Controller
111
Setting Storage Table
112
116

Digitizing
106
Digitized RF Signal
1603
Phase Detector
301
Low Pass Filter
302
VCO
1701
Frequency Divider
304
Sync Clock
Demodulating
108
110
Register
305
Register
306
VCO Setting
Frequency Division Ratio Setting
System Controller
111
Setting Storage Table
112

FIG. 18

| Address | Constants Stored |
|---|---|
| 1 | VCO Gain (Radius : 24mm～30mm) |
| 2 | VCO Gain (Radius : 30mm～35mm) |
| 3 | VCO Gain (Radius : 35mm～40mm) |
| 4 | VCO Gain (Radius : 40mm～45mm) |
| 5 | VCO Gain (Radius : 45mm～50mm) |
| 6 | VCO Gain (Radius : 50mm～58mm) |
| 7 | Frequency Division Ratio (Radius : 24mm～30mm) |
| 8 | Frequency Division Ratio (Radius : 30mm～35mm) |
| 9 | Frequency Division Ratio (Radius : 45mm～50mm) |
| 10 | Frequency Division Ratio (Radius : 40mm～45mm) |
| 11 | Frequency Division Ratio (Radius : 45mm～50mm) |
| 12 | Frequency Division Ratio (Radius : 50mm～58mm) |
| | |

*FIG. 20*

Setting Storage Table

| Address | Constants Stored |
| --- | --- |
| 1 | VCO Gain (Radius : 24mm～58mm) |
| 2 | Frequency Division Ratio (Radius : 24mm～58mm) |
| | |

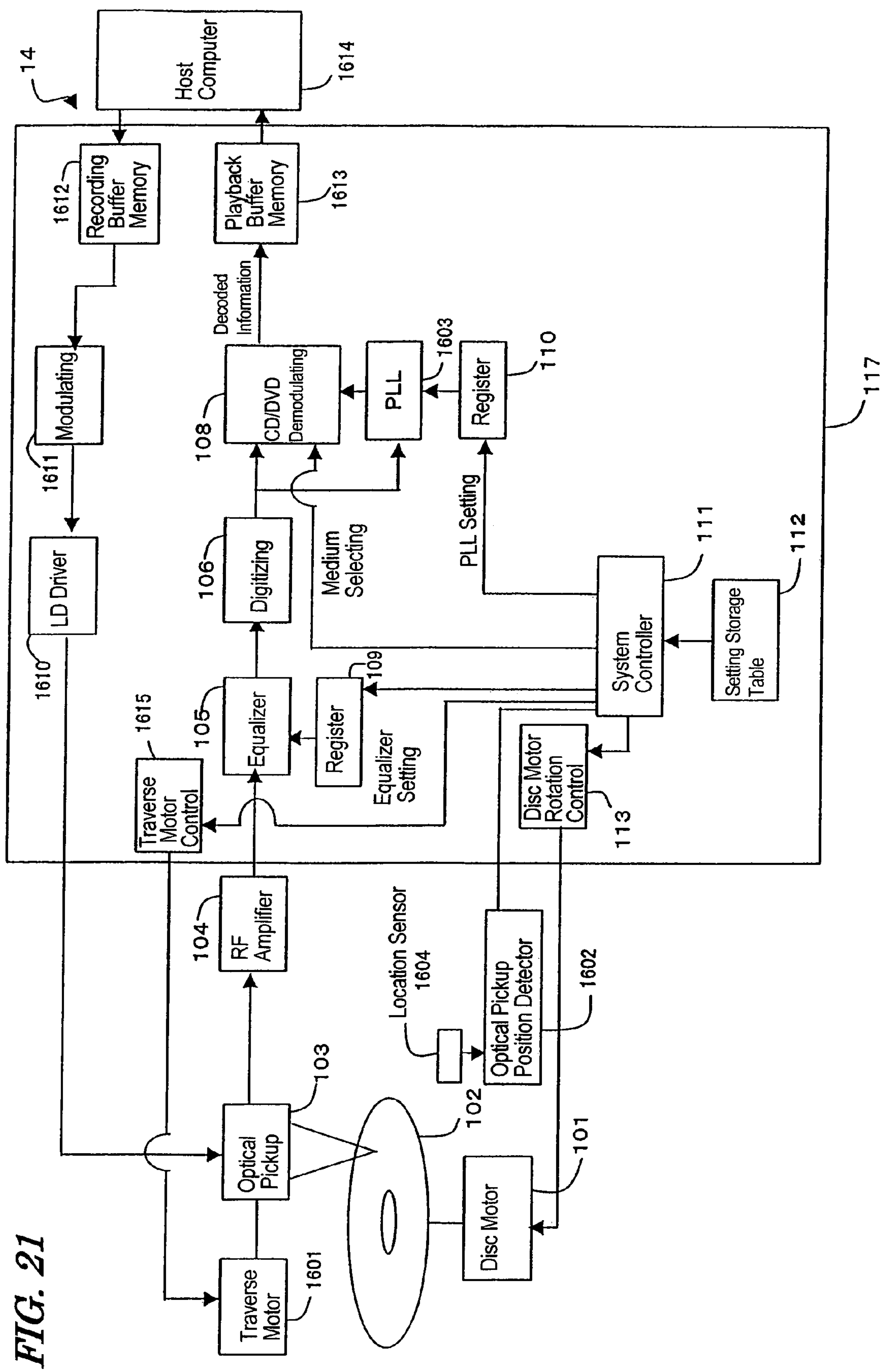
FIG. 21
14
Host Computer
1614
Recording Buffer Memory
1612
Playback Buffer Memory
1613
Decoded Information
Modulating
1611
CD/DVD Demodulating
108
PLL
1603
Register
110
117
LD Driver
1610
Digitizing
106
Medium Selecting
PLL Setting
System Controller
111
Setting Storage Table
112
Equalizer
105
Register
109
Equalizer Setting
Traverse Motor Control
1615
Disc Motor Rotation Control
113
RF Amplifier
104
Location Sensor
1604
Optical Pickup Position Detector
1602
Optical Pickup
103
102
Disc Motor
101
Traverse Motor
1601

OPTICAL DISC CONTROLLER AND OPTICAL DISC DEVICE HAVING THE SAME

CROSS-REFERENCE TO RELATED APPLICATION

This application is a Section 371 of International Application No. PCT/JP03/00814, filed Jan. 28, 2003, the disclosure of which is incorporated herein by reference.

TECHNICAL FIELD

The present invention relates to an optical disc drive that can process either two or more types of information storage media or at least two different transfer rate modes. More particularly, the present invention relates to an optical disc controller for controlling a read clock signal for an information storage medium and its number of revolutions and also relates to an optical disc drive including such an optical disc controller.

BACKGROUND ART

A CD (compact disc) was originally developed as an information storage medium (which will be referred to herein as a "disc") to record music thereon. Nowadays, however, the CD is also extensively used as an information storage medium for computers. Meanwhile, DVDs (digital versatile discs) and other types of discs, which are developed as high-density multi-purpose media from the outset, are also on the market now. Under the circumstances such as these, there is an increasing demand for a system that can play multiple types of discs with mutually different storage densities (such as CDs and DVDs) by itself. Furthermore, a system that can write data on multiple types of discs with mutually different storage densities has been put on the market recently.

In such a system that can read or write information from/on multiple types of discs, the user picks a type of disc according to the type of information to be read and/or written. For example, as for music information or PC (personal computer) data with a relatively small capacity, a CD-ROM disc, a recordable CD-R disc, or a rewritable CD-RW disc is normally used. On the other hand, as for video information or PC data with a relatively big capacity, a DVD-ROM disc or a rewritable DVD-RAM disc or DVD-RW disc is used. Furthermore, to store high-quality video of a BS digital broadcast, a huge capacity (e.g., 20 GB or more) storage medium, which uses a blue laser beam, has recently been developed as a highly prospective product.

Among various optical disc drives for PCs, optical disc drives that adopt a constant angular velocity (CAV) writing technique, characterized by using different transfer rates for inside and outside portions of the same medium, recently outnumber optical disc drives that adopt a constant linear velocity (CLV) writing technique, characterized by using the same transfer rate at any read location on the disc, in order to increase the highest transfer rate and access performance in CD-ROMs or DVD-ROMs, for example. Such a drive usually performs a playback operation at as high a transfer rate as possible, which is defined by the highest possible performance of the drive, but sometimes cannot perform a playback operation at all due to a scratch or dirt on the information storage side of the disc or the degree of eccentricity or shifted center of mass. To avoid such a situation, the function of changing the rotational velocities and switching the transfer rates according to the disc state has recently been introduced.

Hereinafter, the procedure of retrieving information from an optical disc will be described briefly. First, a laser beam is radiated toward the information storage side of the optical disc and its reflected light is detected at an optical pickup and then amplified by an RF amplifier, thereby generating an RF playback signal representing the quantity of light reflected. The RF playback signal generated in this manner then has its RF noise (which is located outside of its signal frequency band) removed by an equalizer. Also, in the vicinity of its high frequency components that have had their amplitudes decreased due to intersymbol interference, the RF playback signal is boosted. Thereafter, the RF playback signal is digitized to generate read data. Meanwhile, a read clock signal, which is in phase with the read data, is generated from the read data by a PLL (phase-locked loop) circuit. Subsequently, a demodulating section generates decoded information from the read data and read clock signal, and then the information is transferred to a host by way of an interface circuit (such as ATAPI or SCSI).

In this procedure, if the types of discs to play or the play modes thereof are different, then the data transfer rates and the RF frequency bands of the read data are also different. More specifically, the frequency band to be extracted and boosted by the equalizer and the frequency of the clock signal to be generated by the PLL circuit change with the type of the disc to play and the play mode thereof. The read clock signal is determined by the transfer rate and the reference clock frequency as defined by the disc standard (e.g., about 27 MHz for a DVD-ROM). Accordingly, if discs to play or transfer rate modes thereof are changed, then multiple lines of those frequency-dependent circuits are prepared for an optical disc drive and switched depending on specific conditions.

If the read and write operations are carried out by the CLV technique, then the transfer rate is constant and just one line of equalizer and PLL is required. On the other hand, if the read and write operations are carried out by the CAV technique, then the transfer rate changes with a read radial location on the disc. Accordingly, those frequency-dependent circuits need to change their processing reference frequencies according to the read radial location, too.

For these reasons, a conventional CAV optical disc drive that can process multiple types of discs chooses one of a plurality of demodulating sections corresponding to those types of discs during its loading, for example. Then, the optical disc drive divides the disc read locations into a number of radial zones. In reading data from the respective zones, the selected demodulating section sequentially picks one of multiple circuits, associated with the respective transfer rates, after another.

Hereinafter, a conventional optical disc drive that can process multiple types of discs in multiple play modes will be described with reference to the accompanying drawings.

FIG. 24 is a block diagram showing a conventional optical disc. In the following example, a drive that uses a CD and a DVD as two types of discs and can play the DVD in two different playback modes (i.e., high-speed and low-speed modes) will be described. In FIG. 24, three lines of equalizer sections 2003, 2004 and 2005 and PLL sections 2006, 2007 and 2008 are provided. Also, a CD demodulating section 2009 and a DVD demodulating section 2010 are provided as two demodulating sections. These circuits are selectively used by a disc type selector 2001 and a playback mode selector 2002.

In playing a CD, an infrared laser diode 1021 with a wavelength of 780 nm is activated and a predetermined CD light beam 1023 is produced by optical members (not shown) in the optical pickup. On the other hand, in playing a DVD, a red laser diode 1022 with a wavelength of 650 nm is activated and a predetermined DVD light beam (not shown) is produced by optical members (not shown) in the optical pickup.

When these two laser diodes or light beams are switched, the disc type selector 2001 selects the circuits required. For example, in playing a CD, the disc type selector 2001 connects contacts A and C together. Then, an RF playback signal, which has been detected by the optical pickup 103 from the optical disc 102 being rotated by a disc motor 101, is amplified by an RF amplifier 104. The amplified RF playback signal passes the disc type selector 2001 and is input to the equalizer section 2003. The equalizer section 2003 boosts the RF playback signal in a signal frequency band that is suited to playing the CD, thereby generating an RFEQ signal.

Then, a digitizing section 106 digitizes the RFEQ signal, thereby generating read data. From this read data, the PLL section 2006 generates a read clock signal. Using this read data and read clock signal, the CD demodulating section 2009 demodulates the information that is stored on the CD and then transfers the information to a host (not shown).

For example, in playing a DVD at the higher speed, the disc type selector 2001 connects contacts C and B together and the play mode selector 2002 connects contacts D and F together. Then, an RF playback signal, which has been detected by the optical pickup 103 from the optical disc 102 being rotated by the disc motor 101, is amplified by the RF amplifier 104. The amplified RF playback signal passes the disc type selector 2001 and mode selector 2002 and is input to the equalizer section 2005. The equalizer section 2005 boosts the RF playback signal in a signal frequency band that is suited to playing the DVD at the higher speed, thereby generating an RFEQ signal.

Then, the digitizing section 106 digitizes the RFEQ signal, thereby generating read data. From this read data, the PLL section 2008 generates a read clock signal. Using this read data and read clock signal, the CD demodulating section 2010 demodulates the information that is stored on the DVD and then transfers the information to the host (not shown).

For example, in playing a DVD at the lower speed, the disc type selector 2001 connects contacts C and B together and the play mode selector 2002 connects contacts D and E together. Then, an RF playback signal, which has been detected by the optical pickup 103 from the optical disc 102 being rotated by the disc motor 101, is amplified by the RF amplifier 104. The amplified RF playback signal passes the disc type selector 2001 and mode selector 2002 and is input to the equalizer section 2004. The equalizer section 2004 boosts the RF playback signal in a signal frequency band that is suited to playing the DVD at the lower speed, thereby generating an RFEQ signal.

Then, the digitizing section 106 digitizes the RFEQ signal, thereby generating read data. From this read data, the PLL section 2007 generates a read clock signal. Using this read data and read clock signal, the CD demodulating section 2010 demodulates the information that is stored on the DVD and then transfers the information to the host (not shown).

As described above, the conventional optical disc drive that can cope with multiple types of discs and multiple transfer rate modes performs read and write operations on those discs by using at least two lines of equalizer sections, PLL sections and demodulating sections. Accordingly, as the number of disc types or transfer rate modes to be handled increases, the circuit scale increases correspondingly.

Thus, to reduce the circuit scale, a configuration, in which a register circuit is provided for these circuits and variables depending on the disc types and transfer modes are changed by modifying the parameters to be set for the register, may be used.

In that case, however, the parameters setting the operating frequencies of a servo circuit (or servo block) or a PLL section (or PLL block) should be defined for each disc type (e.g., CD or DVD), each transfer rate mode (e.g., 16×, 8×, 4× or 2×) and each disc radial location from which information is retrieved. For that purpose, a setting table area is usually provided in the program area of a system controller so as to store all of those parameters associated with the respective disc types, transfer rate modes and radial locations. In the drive described above, supposing the register to be set has 64 bytes, the setting table area in the program area needs 192 bytes to play a CD and a DVD that is processible at two transfer rates.

In that case, every time the number of types of discs to play and the number of transfer rate modes to be supported increase, the required memory capacity increases significantly, thus raising the cost of the optical disc drive, which is a serious problem to solve.

DISCLOSURE OF INVENTION

In order to overcome the problems described above, an object of the present invention is to provide an optical disc controller and an optical disc drive, which can cope with a number of different types of discs and a plurality of transfer rate modes and yet have a simple configuration.

An optical disc controller according to the present invention is used in an optical disc drive that plays optically a first information storage medium and a second information storage medium having a higher storage density than that of the first information storage medium. The optical disc controller includes: a rotation control section for controlling a rotating mechanism that rotates the first and second information storage media; an equalizer for removing first frequency range components from an RF playback signal, obtained by irradiating each of the first and second information storage media with light and detecting light reflected therefrom, and for amplifying the amplitude of second frequency range components thereof; and a phase locking section for generating a sync clock signal to do synchronization detection with respect to a digital playback signal that is obtained by digitizing the output of the equalizer. The rotation control section rotates the first and second information storage media while controlling the rotating mechanism such that RF playback signals are obtained at a first transfer rate and at a second transfer rate, respectively. The maximum playback frequency of the RF playback signal obtained from the first information storage medium at the first transfer rate is substantially equal to that of the RF playback signal obtained from the second information storage medium at the second transfer rate.

In one preferred embodiment, supposing channel clock frequencies of the first and second information storage media are A and B, respectively, the second transfer rate is n (where $1 \leqq n$) times as high as a standard transfer rate of the second information storage medium and the first transfer rate is $n \times (B/A)$ times as high as a standard transfer rate of the first information storage medium.

In another preferred embodiment, the rotation control section controls the rotating mechanism such that the first and second information storage media rotate at a constant linear velocity.

In another preferred embodiment, the rotation control section controls the rotating mechanism such that the first and second information storage media rotate at a constant angular velocity.

In another preferred embodiment, the equalizer is operated by being provided with a pair of setting constants that defines the first and second frequency ranges, respectively. The same pair of setting constants is applied to the first and second frequency ranges either at the first transfer rate or at the second transfer rate.

In another preferred embodiment, the phase locking section includes a voltage controlled oscillator and a frequency divider, which are operated at respective predetermined frequencies by being provided with their setting constants. The same pair of setting constants is provided for the voltage controlled oscillator and the frequency divider either at the first transfer rate or at the second transfer rate.

In another preferred embodiment, the phase locking section includes a frequency divider for dividing the frequency by an integer.

In another preferred embodiment, the optical disc drive also performs a write operation on the first and second information storage media. The optical disc controller further includes a movement control section for driving a moving mechanism that moves an optical pickup in a radial direction of the first or second information storage medium. The optical pickup is used to read or write a signal from/on the first and second information storage media. The movement control section and the rotation control section control the moving mechanism and the rotating mechanism, respectively, such that after a read or write operation has been performed on the first or second information storage medium for a predetermined period of time at a constant linear velocity for a first location in the radial direction while the first or second information storage medium is being rotated at a first rotation velocity so as to achieve a transfer rate that is higher than a standard read or write rate for the first or second information storage medium, a write or read operation is performed on the first or second information storage medium at the first rotation velocity and at a constant angular velocity for a second location.

Another optical disc controller according to the present invention is used in an optical disc drive that plays optically an information storage medium in at least two different transfer rates. The optical disc controller includes: a rotation control section for controlling a rotating mechanism that rotates the information storage medium; a digitizing section for digitizing an RF playback signal obtained from the information storage medium, thereby outputting read data; and a phase locking section, which includes a plurality of frequency dividers with integral frequency division ratios and generates a sync clock signal that is in phase with the read data. The phase locking section generates the sync clock signal by switching the frequency dividers according to the type of the information storage medium or the transfer rate. And the rotation control section controls the rotating mechanism such that the information storage medium has a rotation velocity corresponding to the frequency division ratio.

In one preferred embodiment, the second location is closer to the outer edge of the information storage medium than the first location is.

In another preferred embodiment, the second location is closer to the inner edge of the information storage medium than the first location is, and the transfer rate at the first location is at least 2.4 times as high as the standard transfer rate.

Still another optical disc controller according to the present invention is used in an optical disc drive that plays optically an information storage medium. The optical disc controller includes: a digitizing section for digitizing an RF playback signal obtained from the information storage medium, thereby outputting read data; and a phase locking section, which includes a phase difference detector, a low pass filter, a voltage controlled oscillator and a frequency divider and generates a sync clock signal that is synchronized with the read data. The ratio of a lower limit frequency of a channel clock pulse, generated by the voltage controlled oscillator, to an upper limit frequency thereof is equal to a radius ratio of the innermost edge of the information storage medium to the outermost edge thereof.

Yet another optical disc controller according to the present invention controls an optical disc drive that performs read and write operations on an information storage medium. The optical disc controller includes: a movement control section for driving a moving mechanism that moves an optical pickup in a radial direction of the information storage medium to read or write information from/on the information storage medium; and a rotation control section for controlling a rotating mechanism that rotates the information storage medium. The movement control section and the rotation control section control the moving mechanism and the rotating mechanism, respectively, such that after a read or write operation has been performed on the information storage medium for a predetermined period of time at a constant linear velocity for a first location in the radial direction while the information storage medium is being rotated at a first rotation velocity so as to achieve a transfer rate that is higher than a standard read or write rate for the information storage medium, a write or read operation is performed on the information storage medium at the first rotation velocity and at a constant angular velocity for a second location that is closer to the outer edge than the first location is.

An optical disc drive according to the present invention includes: an optical pickup for obtaining RF playback signals by irradiating a first information storage medium and a second information storage medium, having a higher storage density than that of the first information storage medium, with light and detecting light reflected therefrom; a rotating mechanism for rotating the first and second information storage media; and any of the optical disc controllers described above.

Another optical disc drive according to the present invention includes: an optical pickup for writing a signal on a first information storage medium and a second information storage medium, having a higher storage density than that of the first information storage medium, by irradiating the first and second information storage media with light and for obtaining RF playback signals by irradiating the first and second information storage media with light and detecting light reflected therefrom; a rotating mechanism for rotating the first and second information storage media; a moving mechanism for moving the optical pickup in a radial direction of the first and second information storage media; and the optical disc controller that can perform a write operation as described above.

An optical disc drive controlling method according to the present invention is a method for controlling an optical disc drive that plays optically a first information storage medium and a second information storage medium having a higher storage density than that of the first information storage medium. The method includes the steps of: rotating the first and second information storage media; removing first frequency range components from an RF playback signal, obtained by irradiating each of the first and second information storage media with light and detecting light reflected therefrom, and amplifying the amplitude of second frequency range components thereof; and generating a sync clock signal to do synchronization detection with respect to a digital playback signal that is obtained by digitizing the output of an equalizer. The first and second information storage media are rotated so as to achieve a first transfer rate and a second transfer rate at which the maximum playback frequency of the RF playback signal obtained from the first information storage medium is substantially equal to that of the RF playback signal obtained from the second information storage medium.

In one preferred embodiment, supposing channel clock frequencies of the first and second information storage media are A and B, respectively, the second transfer rate is n (where $1 \leqq n$) times as high as a standard transfer rate of the second information storage medium and the first transfer rate is $n \times (B/A)$ times as high as a standard transfer rate of the first information storage medium.

In another preferred embodiment, the first and second information storage media are rotated at a constant linear velocity.

In another preferred embodiment, the first and second information storage media are rotated at a constant angular velocity.

In another preferred embodiment, the first and second frequency ranges are substantially equalized with each other at the first and second transfer rates.

In another preferred embodiment, the same pair of setting constants is provided for a voltage controlled oscillator and a frequency divider, which are used to generate the sync clock signal, either at the first transfer rate or at the second transfer rate.

In another preferred embodiment, a voltage controlled oscillator and a frequency divider are used to generate the sync clock signal and the frequency divider has an integral frequency division ratio.

In another preferred embodiment, the optical disc drive also performs a write operation on the first and second information storage media. After a read or write operation has been performed on the first or second information storage medium for a predetermined period of time at a constant linear velocity for a first location in the radial direction while the first or second information storage medium is being rotated at a first rotation velocity so as to achieve a transfer rate that is higher than a standard read or write rate for the first or second information storage medium, a write or read operation is performed on the first or second information storage medium at the first rotation velocity and at a constant angular velocity for a second location.

In one preferred embodiment, the second location is closer to the outer edge of the information storage medium than the first location is.

In another preferred embodiment, the second location is closer to the inner edge of the information storage medium than the first location is, and the transfer rate at the first location is at least 2.4 times as high as the standard transfer rate.

BRIEF DESCRIPTION OF DRAWINGS

FIG. 8 is a schematic representation showing constants to be stored in a setting storage table according to this preferred embodiment.

FIG. 18 schematically shows exemplary settings to be stored on a setting storage table in a conventional optical disc drive.

FIG. 20 schematically shows exemplary settings to be stored on a setting storage table in an optical disc drive according to this preferred embodiment.

FIG. 21 is a block diagram showing an optical disc drive according to a fourth embodiment of the present invention.

BEST MODE FOR CARRYING OUT THE INVENTION

EMBODIMENT 1

Figure 1:
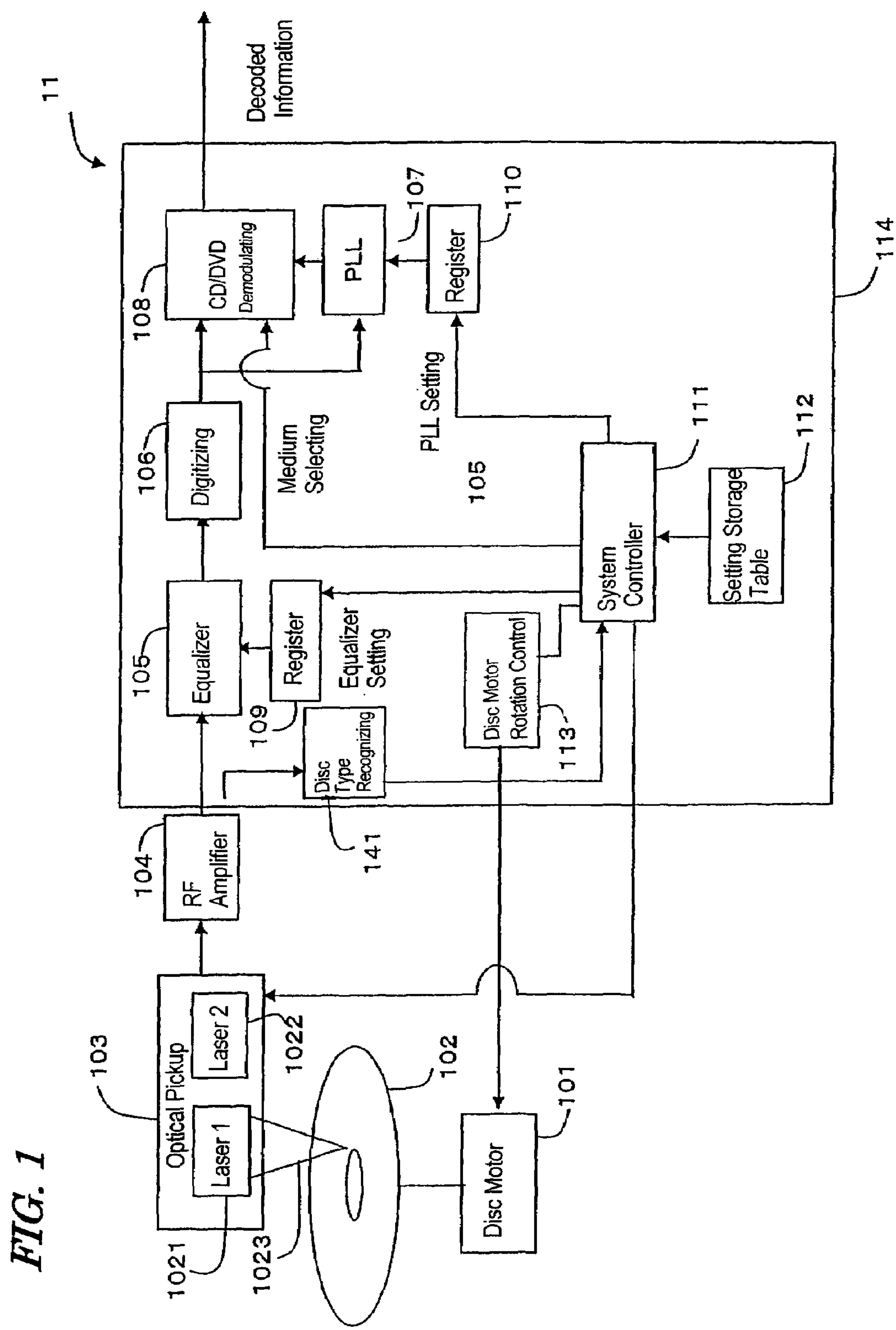
FIG. 1 is a block diagram showing an optical disc drive according to a first embodiment of the present invention.

FIG. 1 is a block diagram showing an optical disc drive including an optical disc controller according to a first preferred embodiment of the present invention. The optical disc drive 11 includes a disc motor 101, an optical pickup 103, an RF amplifier 104 and the optical disc controller 114. The optical pickup 103 may include a laser diode 1021 to emit a laser beam to play a CD and another laser diode 1022 to emit a laser beam to play a DVD, for example.

In this optical disc drive 11, while the optical disc 102 is being rotated by the disc motor 101 as a rotating mechanism, the optical pickup 103 retrieves information from the optical disc 102 as an RF playback signal. The RF playback signal is amplified by the RF amplifier circuit 104. Then, the amplified RF playback signal is input to the optical disc controller 114.

The optical disc controller 114 includes a system controller 111, a setting storage table 112, a disc type recognizing section 141, an equalizer section 105, a digitizing section 106, a demodulating section 108, a PLL section 110 and a disc motor rotation control section 113. In addition, registers 109 and 110 are provided so as to make predetermined settings for the equalizer 105 and PLL section 107, respectively.

The RF playback signal is output from the RF amplifier to the disc type recognizing section 141. In accordance with the signal intensity thereof, for example, the disc type recognizing section 141 determines whether or not the type of the optical disc 102 loaded in this optical disc drive 11 and the selected laser diode 1021 or 1022 make an appropriate combination, and then passes the result to the system controller 111.

The RF playback signal output from the RF amplifier is also input to the equalizer section 105 of the optical disc controller 114. The equalizer section 105 removes the RF noise, which is located outside of the predetermined frequency band of the RF playback signal, and boosts the high frequency components of the RF playback signal, which have significantly deteriorated due to intersymbol interference, thereby outputting an EQRF signal.

The EQRF signal is digitized by the digitizing section 106, and the resultant digital signal is input to the demodulating section 108 and PLL section 107. The PLL section 107 generates a sync clock signal, which is necessary for the demodulating section 108 to make a window for extracting data from the EQRF signal. In response to the sync clock signal supplied from the PLL section 107, the demodulating section 108 performs sync detection on the EQRF signal, thereby outputting digitized read data. The errors of the read data are corrected by an error corrector circuit (not shown), thereby decoding it into valid information.

Figure 2:
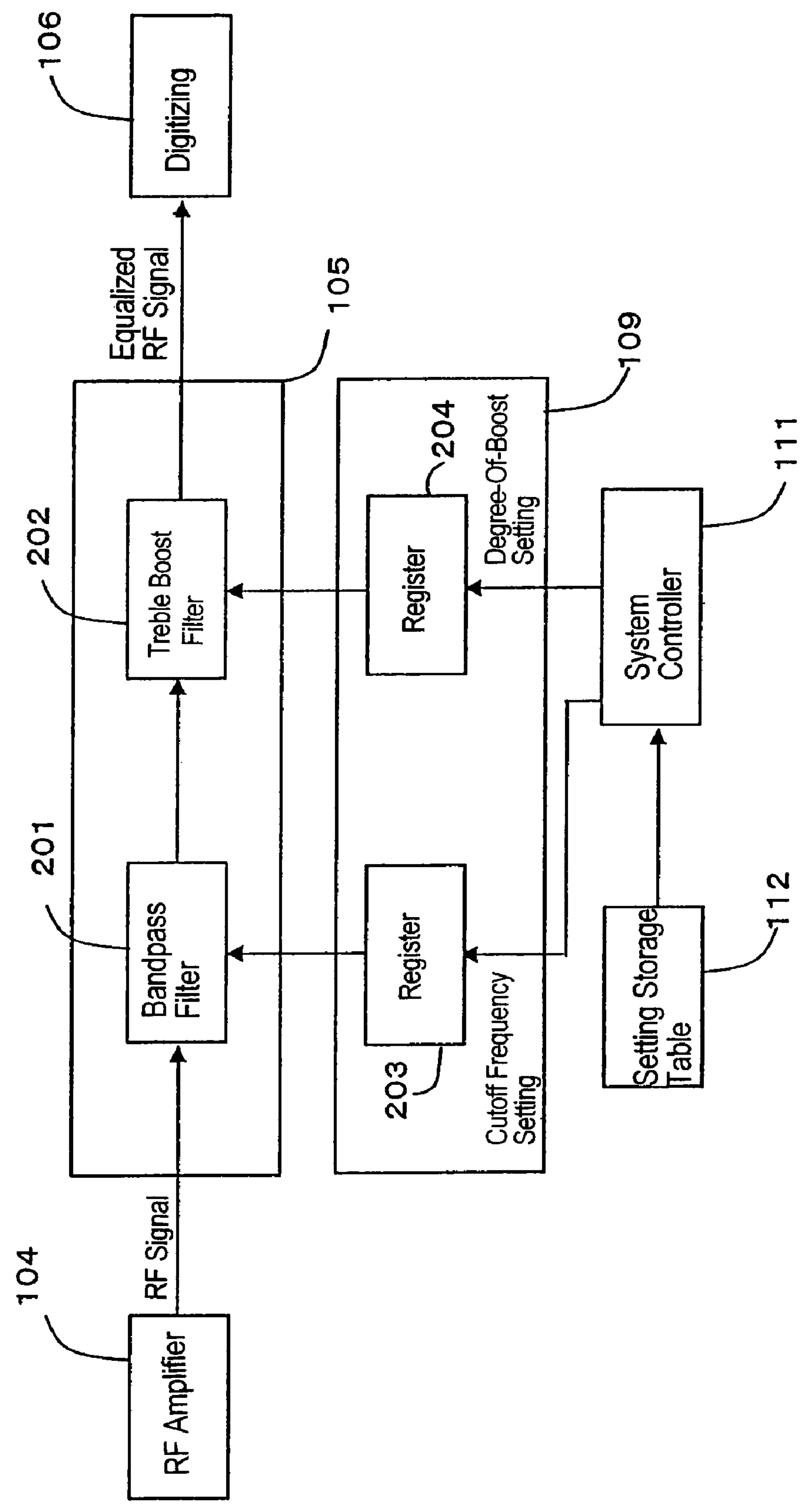
FIG. 2 is a block diagram showing configurations for the equalizer section and register section shown in FIG. 1.

FIG. 2 is a block diagram showing detailed configurations for the equalizer section 105 and the register 109. The equalizer section 105 includes a bandpass filter 201 and a treble boost filter 202, while the register 109 includes a cutoff frequency setting register 203 and a degree-of-boost setting register 204.

The RF playback signal obtained from the optical disc has been subjected to an EFM modulation or 8-16 modulation, for example, and includes frequency components to be determined by the optical disc with respect to one channel clock period T. For instance, a signal obtained from a CD includes 3T to 11T frequency components, while one obtained from a DVD includes 3T to 14T frequency components. The information stored on the CD or DVD is included as signals having these frequencies. Accordingly, to demodulate the information without errors, only effective frequency components need to be extracted from the RF playback signal.

More specifically, the RF playback signal, detected by the optical pickup 103, includes unnecessary frequency components (e.g., radio frequency noise), and its signal amplitude changes from one frequency component to another because of its deterioration due to intersymbol interference, for example. Accordingly, to demodulate the information correctly, those unnecessary frequency range components are removed from the RF playback signal by the bandpass filter 201 and the attenuated frequency range components are amplified by the treble boost filter 202, thereby equalizing the amplitudes of the respective frequency components. The frequency at which the frequency band is limited (i.e., the cutoff frequency) is set by the system controller 111 for the cutoff frequency setting register 203. The degree of amplification of the attenuated frequency components (i.e., the degree of boost) is also set by the system controller 111 for the degree-of-boost setting register 204. As will be described in detail later, the constants to be supplied to the cutoff frequency setting register 203 and degree-of-boost setting register 204 are stored in the setting storage table 112.

Figure 3:
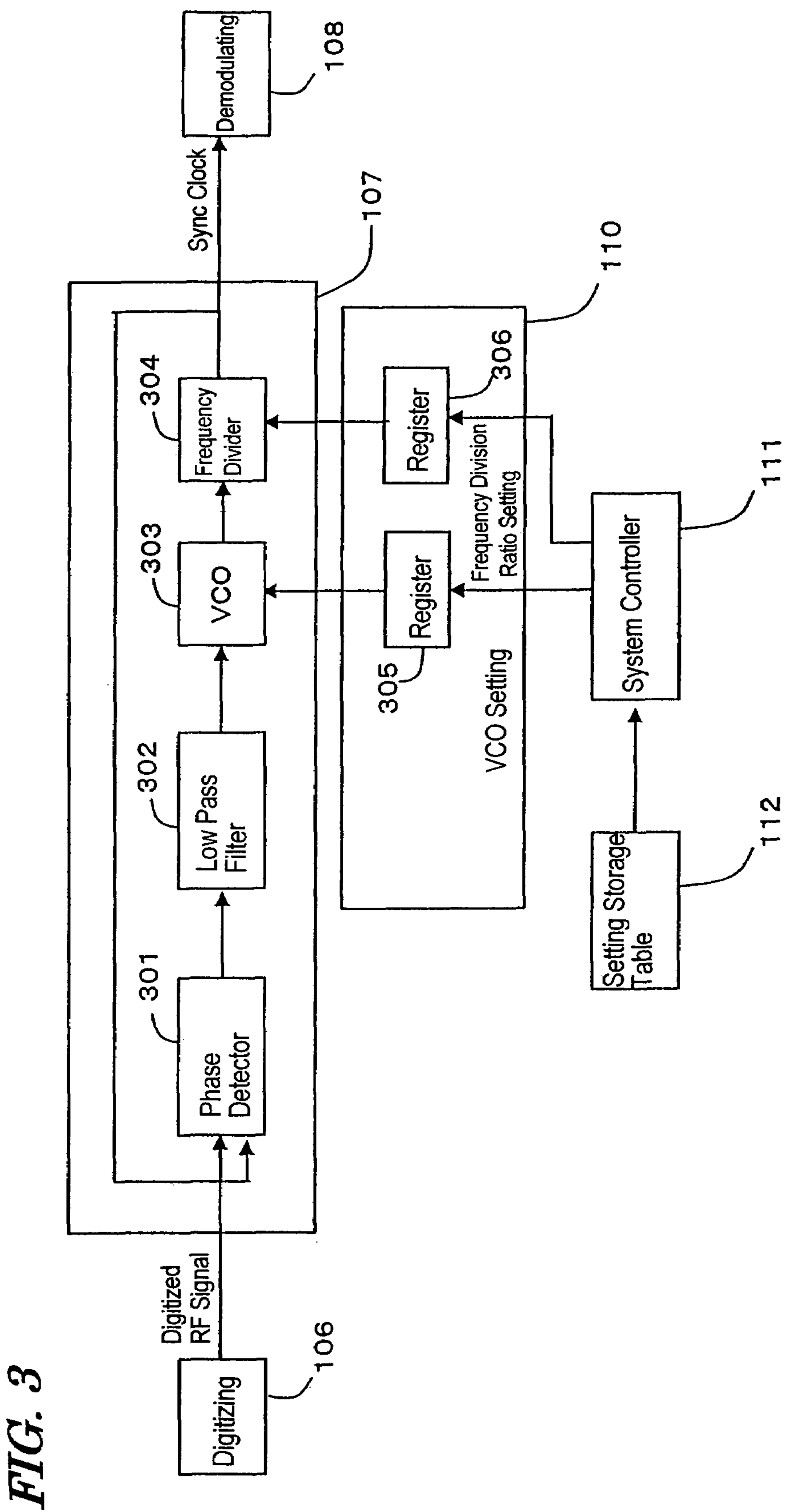
FIG. 3 is a block diagram showing configurations for the PLL section and register section shown in FIG. 1.

FIG. 3 is a block diagram showing configurations for the PLL section 105 and register 110. The PLL section 105 includes a phase detector 301, a low pass filter 302, a VCO 303 and a frequency divider 304. The register 110 includes a VCO gain setting register 305 and a frequency division ratio setting register 306. The digitized RF playback signal is input to the phase detector 301, which detects a phase difference between the digitized RF playback signal and the sync clock signal that is the output of the PLL section 107 (or frequency divider 304), thereby outputting an error signal to the low pass filter 302. In response, the low pass filter 302 outputs a control voltage, representing the phase difference, to the VCO (voltage controlled oscillator) 303. The VCO 303 oscillates a signal having a frequency associated with the control voltage and then supplies it to the frequency divider 304. And the frequency divider 304 divides the frequency of the signal supplied from the VCO 303, thereby generating and outputting a sync clock signal.

The oscillation frequency of the VCO 303 and the frequency division ratio of the frequency divider 304 are determined by the setting constants to be defined by the VCO gain setting register 305 and frequency division ratio setting register 306, respectively. The system controller 111 chooses required setting constants from the setting storage table 112 on which the constants to be set for the VCO gain setting register 305 and frequency division ratio setting register 306 are stored. The constants to be defined for the setting storage table 112 will be described in detail later.

Next, the transfer rate modes of the optical disc drive 11 will be described. The optical disc drive 11 can process a first information storage medium and a second information storage medium having mutually different storage densities. The storage density of the second information storage medium is higher than that of the first information storage medium. Supposing channel clock frequencies of the first and second information storage media are A and B, respectively, the second transfer rate is n (where n is either a rational number or an irrational number satisfying $1 \leqq n$) times as high as a standard transfer rate of the second information storage medium and the first transfer rate is $n \times (B/A)$ times as high as a standard transfer rate of the first information storage medium. As used herein, the "transfer rate" refers to a rate at which information is read or written from/on a given optical disc.

In this case, the maximum playback frequency of the RF playback signal obtained from the first information storage medium at the first transfer rate is substantially equal to that of the RF playback signal obtained from the second information storage medium at the second transfer rate. A situation where "two maximum playback frequencies are substantially equal to each other" refers herein to a situation where the difference between the two maximum playback frequencies is within 10% of the lower maximum playback frequency.

Thus, the setting to be defined for the PLL section 107 in playing the first information storage medium at the higher transfer rate can be matched with that for the second information storage medium.

Hereinafter, a specific example, in which the first and second information storage media are a CD and a DVD, respectively, will be described. First, it will be described how to play them by the CLV (constant linear velocity) method.

To be exact, the channel clock frequency of a CD is 4.3218 MHz and the channel clock frequency of a DVD is 26.15625 MHz. In the following description, however, calculations will be done with the channel clock frequencies of a CD and a DVD rounded down to 4.32 MHz and 26.16 MHz, respectively. The channel clock frequency of a DVD is 6.06 times (i.e., approximately 6 times) as high as that of a CD (i.e., 26.16/4.32). Accordingly, in playing a CD and a DVD by the CLV method, a standard transfer rate (1×) is set as a transfer rate mode for a CD, and another standard transfer rate (1×) is set as a transfer rate mode for a DVD. Also, a transfer rate approximately 6 times as high as the standard transfer rate (6×) is defined as the higher transfer rate than the standard transfer rate of the CD. Furthermore, if the transfer rate modes of the DVD include a transfer rate that is twice as high as the standard rate, an approximately 12 time higher transfer rate (12×) is defined as another transfer rate mode for the CD. That is to say, the transfer rate modes of the CD include 1×, 6× and 12×, while the transfer rate modes of the DVD include 1× and 2×. The system controller 111 instructs the disc motor rotation control section 113 to define these transfer rates.

In this case, the setting of the PLL section 107 to play a CD at the 6× transfer rate may be the same as that of the PLL section 107 to play a DVD at the standard transfer rate. In the same way, the setting of the PLL section to play a CD at the 12× transfer rate may be the same as that of the PLL section 107 to play a DVD at the 2× transfer rate. Accordingly, the settings that are stored on the setting storage table 112 and that are defined for the VCO setting register 305 and frequency division ratio setting register 306 to control the PLL section 107 need to be prepared in three sets for the CD standard transfer rate mode, DVD standard transfer rate mode and DVD 2× transfer rate mode, respectively.

Figure 4:
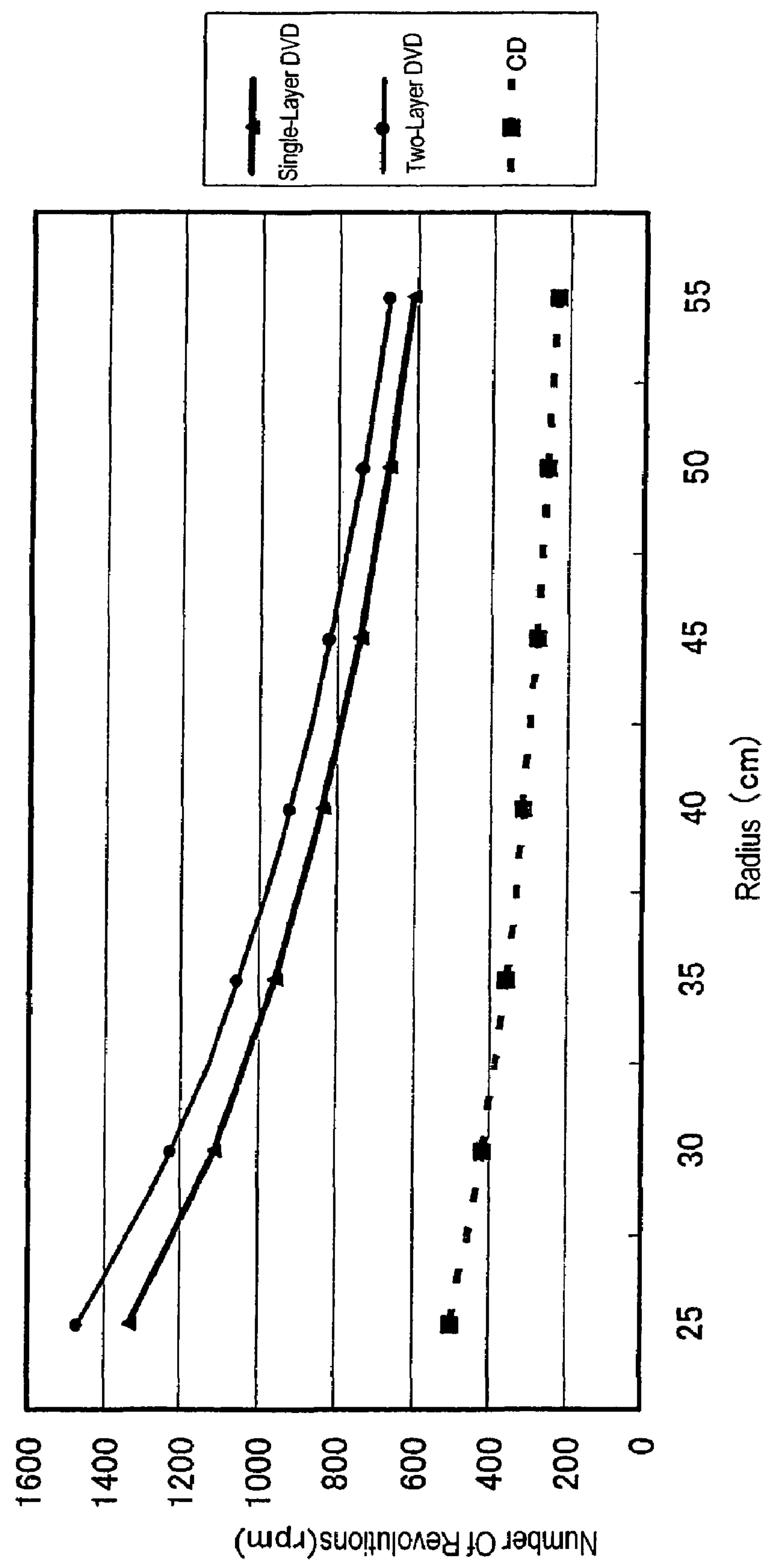
FIG. 4 is a graph showing how the number of revolutions changes with the radial position of an optical pickup in a CLV method.

Such a control of the number of revolutions will be described in further detail. In playing a single-layer DVD-ROM disc at the standard transfer rate (1×), the playback operation is performed at a constant PLL clock frequency of 26.16 MHz. Thus, the disc needs to be rotated such that the linear velocity becomes equal to 3.49 m/s. More specifically, as shown in FIG. 4, the motor control section 113 of the disc motor 101 is instructed to rotate the disc at 1,389 rpm when the optical pickup 103 is located at an inside position (e.g., at a radial location of 24 mm) of the disc and at 575 rpm when the optical pickup 103 is located at an outside position (e.g., at a radial location of 58 mm) of the disc.

In playing a two-layer DVD-ROM disc at the standard transfer rate (1×), the disc needs to be rotated at a linear velocity of 3.84 m/s to perform the playback operation at a constant PLL clock frequency of 26.16 MHz. More specifically, as shown in FIG. 4, the motor control section 113 of the disc motor 101 is instructed to rotate the disc at 1,529 rpm when the optical pickup 103 is located at an inside position (e.g., at a radial location of 24 mm) of the disc and at 633 rpm when the optical pickup 103 is located at an outside position (e.g., at a radial location of 58 mm) of the disc.

The linear velocity of a CD-ROM is lower than that of a DVD. In playing a CD-ROM disc at the standard transfer rate (1×), the disc needs to be rotated at a linear velocity of 1.3 m/s to perform the playback operation at a constant PLL clock frequency of 4.321 MHz. More specifically, as shown in FIG. 4, the motor control section 113 of the disc motor 101 is instructed to rotate the disc at 518 rpm when the optical pickup 103 is located at an inside position (e.g., at a radial location of 24 mm) of the disc and at 214 rpm when the optical pickup 103 is located at an outside position (e.g., at a radial location of 58 mm) of the disc.

Figure 5:
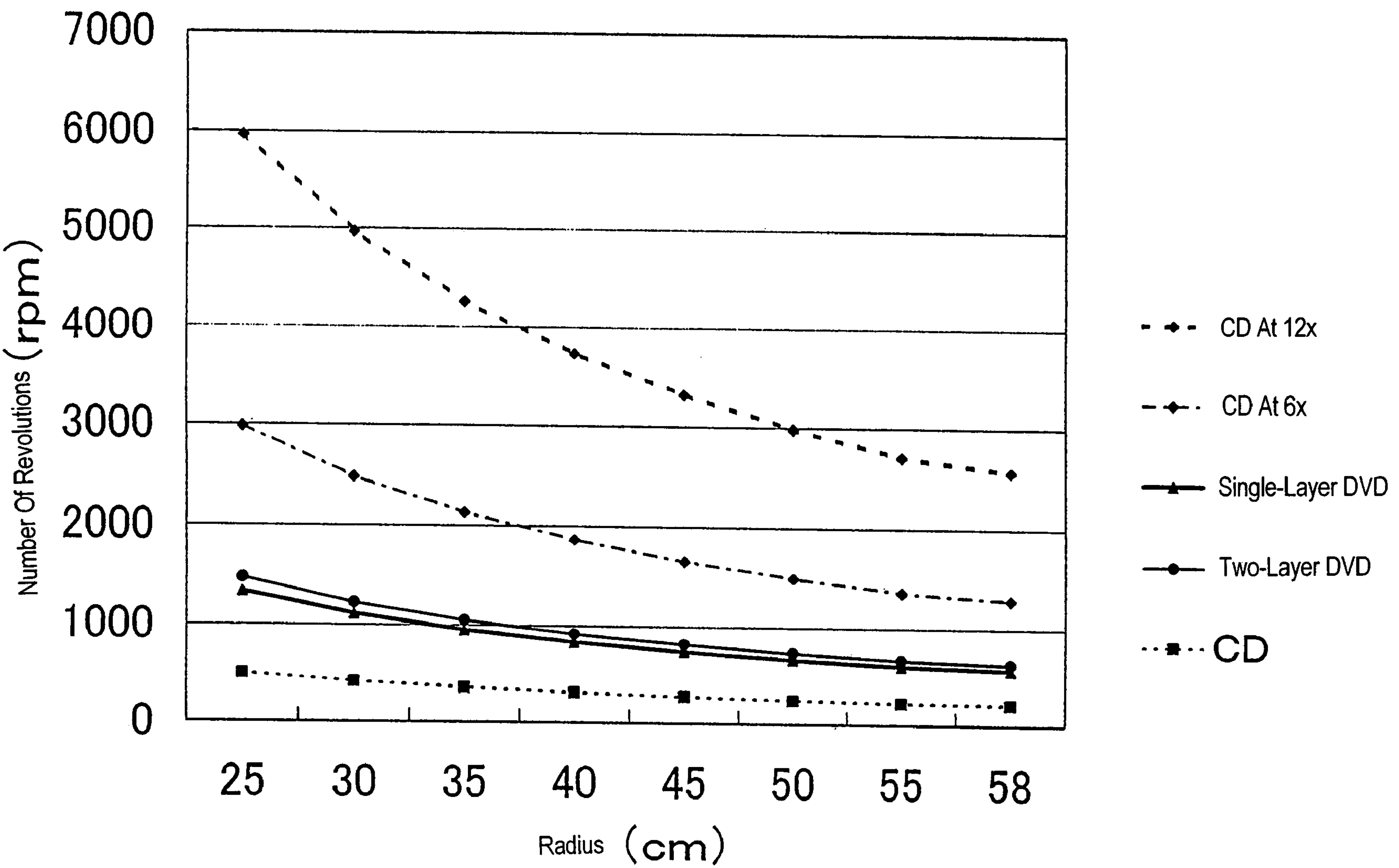
FIG. 5 is a graph showing transfer rate modes when the CLV method is adopted in this preferred embodiment.

In playing a CD-ROM disc at the 6× transfer rate, as shown in FIG. 5, the motor control section 113 of the disc motor 101 is instructed to rotate the disc at 3,105 rpm when the optical pickup 103 is located at an inside position (e.g., at a radial location of 24 mm) of the disc and at 1,285 rpm when the optical pickup 103 is located at an outside position (e.g., at a radial location of 58 mm) of the disc.

Also, if a mode to play a DVD-ROM disc at the 2× transfer rate is defined, then a mode to play a CD-ROM disc at the 12× transfer rate can be added without further increasing the PLL clock frequencies at the PLL section 107. In that case, the motor control section 113 of the disc motor 101 is instructed to rotate the disc at 6,210 rpm when the optical pickup 103 is located at an inside position (e.g., at a radial location of 24 mm) of the disc and at 2,570 rpm when the optical pickup 103 is located at an outside position (e.g., at a radial location of 58 mm) of the disc.

In this manner, by setting a transfer rate of the first information storage medium, which is higher than the standard transfer rate thereof, B/A times as high as a transfer rate of the second information storage medium where A and B are the respective channel clock frequencies of the first and second information storage media, the processing loads can be easily coped with to the very limits of the disc motor and other mechanisms of the optical disc drive and the performance limit of the optical pickup thereof, for example.

Figure 6:
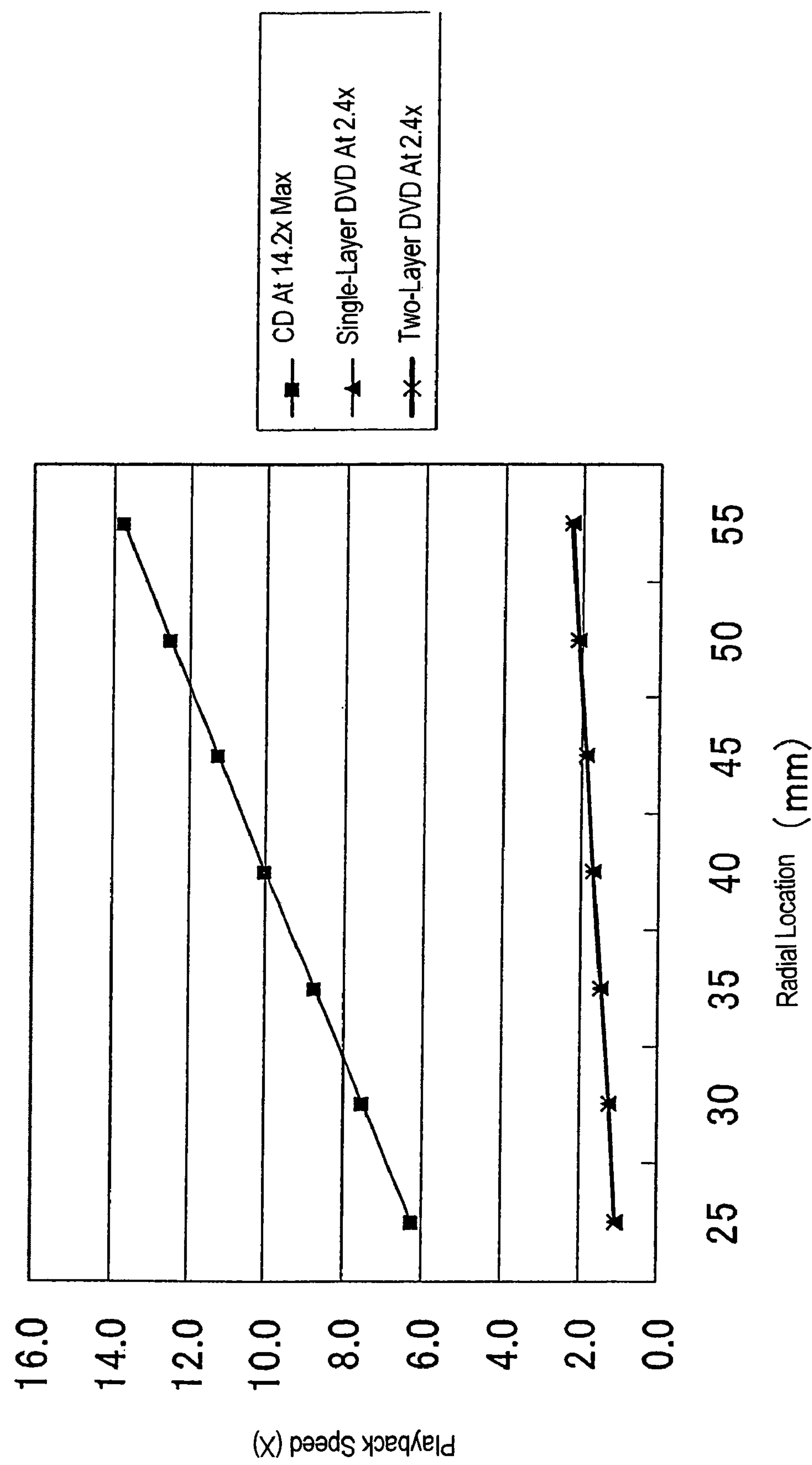
FIG. 6 is a graph showing transfer rate modes when a CAV method is adopted in this preferred embodiment.

Similar techniques are equally applicable to the read operations by the CAV (constant angular velocity) method. As shown in FIG. 6, when the optical pickup 103 is located at an inside position (at a radial location of 24 mm) of the disc, a DVD disc is rotated at the standard transfer rate of 1,389 rpm. If data is read from the vicinity of an outside position of 58 mm of the disc being rotated at this rotational velocity, then the transfer rate will be 2.42 times (approximately 2.4 times) as high as the standard transfer rate. In the CAV method, the PLL frequency is intentionally equalized with that of the read data, thereby switching the VCO oscillation frequencies between the inside and outside positions.

In that case, when the optical pickup 103 is located at an inside position (at a radial location of 24 mm) of the disc, a CD disc is rotated at the 6× transfer rate of 1,389 rpm. If data is read from the vicinity of an outside position of 58 mm of the disc being rotated at this rotational velocity, then the transfer rate will be 14.46 times (approximately 14.5 times) as high as the standard transfer rate.

If these two types of discs are rotated by the CAV method at the rotational velocity described above, then the resultant transfer rates will be equal to each other. Thus, the same frequency may be set for the PLL section.

It should be noted that the user data on a DVD starts from a radial location of approximately 24 mm while the user data on a CD starts from a radial location of approximately 25 mm. However, such a small difference is sufficiently negligible and should cause no serious problems in view of the variation in linearly velocity, for example.

Next, the setting of the equalizer section 105 will be described. As described above, by controlling the transfer rates, not just the setting of the PLL section 107 but also that of the equalizer section 105 for removing noise from the RF playback signal and boosting the effective signal can be made common in multiple modes.

More specifically, the frequencies of an RF playback signal obtained from a CD are defined to fall within the range of 3T to 11T (where T=1/4.32 MHz) with respect to a reference channel clock frequency of 4.32 MHz. Accordingly, at the standard transfer rate, the RF playback signal has a frequency range of 196 kHz to 720 kHz. On the other hand, the frequencies of an RF playback signal obtained from a DVD are defined to fall within the range of 3T to 14T (where T=1/26.16 MHz) with respect to a reference channel clock frequency of 26.16 MHz. Accordingly, at the standard transfer rate, the RF playback signal has a frequency range of 934 kHz to 4.36 MHz.

In playing a CD at the 6× transfer rate, the RF playback signal has a frequency range of 1.176 MHz to 4.320 MHz, which is roughly equal to the frequency range of a DVD being played at the standard transfer rate. Accordingly, if the overlapping frequency ranges of the RF playback signals to be obtained by playing a CD at the 6× transfer rate and by playing a DVD at the standard transfer rate are defined as a common frequency range, then the setting of the equalizer section 105 in playing the CD at the 6× transfer rate may be equal to its setting in playing the DVD at the standard transfer rate. That is to say, if there is just one pair of settings to be supplied to the cutoff frequency setting register 203 and degree-of-boost setting register 204, these two modes can be coped with. The same statement is applicable to playing the CD and DVD at higher transfer rates. For example, the frequency range of the RF playback signal to be obtained by playing the CD at the 12× transfer rate substantially matches that of the RF playback signal to be obtained by playing the DVD at the 2× transfer rate.

Figure 7:
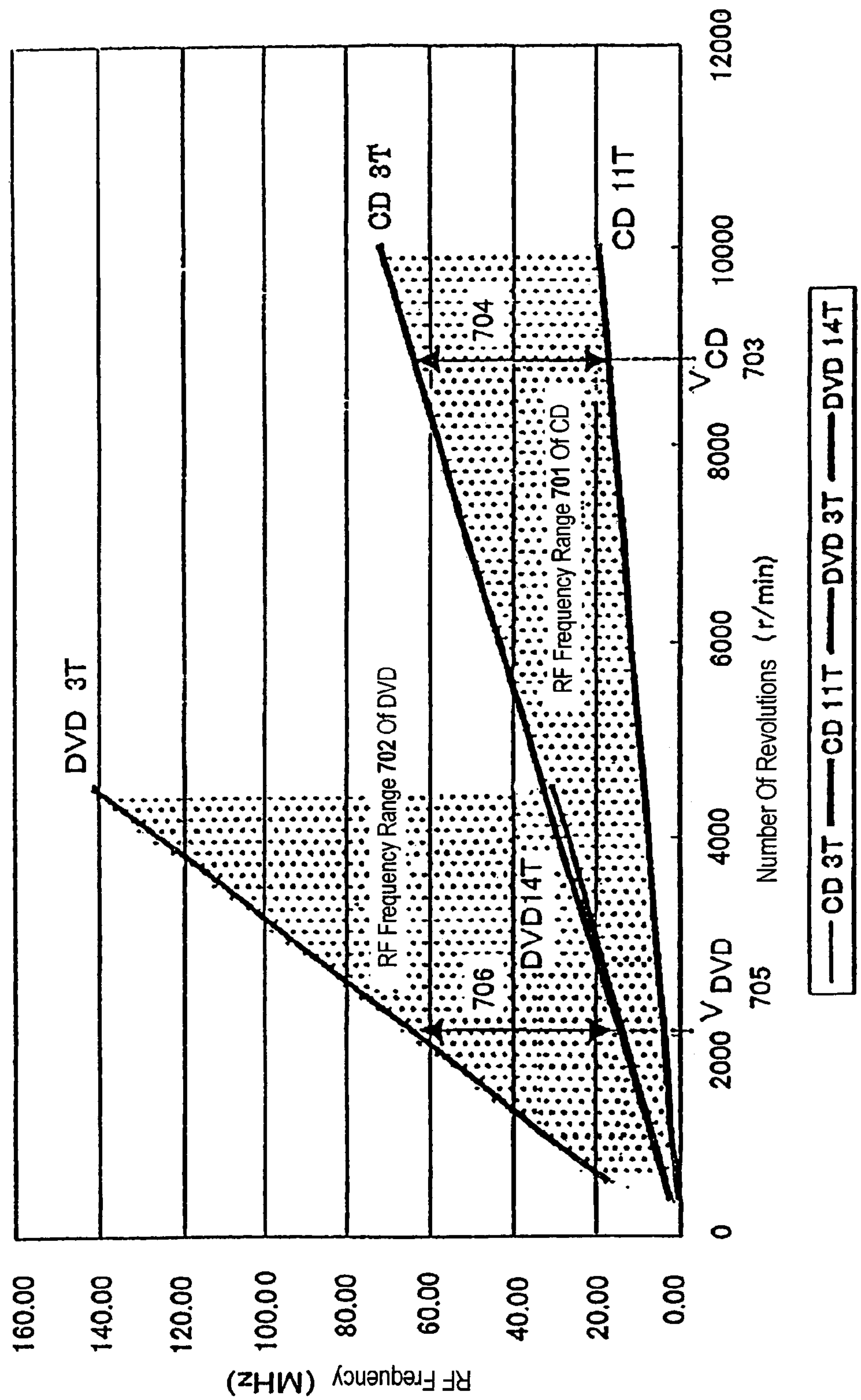
FIG. 7 is a graph showing relationships between the number of revolutions of the disc and the RF frequency band thereof for a CD and a DVD.

FIG. 7 is a graph showing relationships between the number of revolutions of a CD or DVD and the RF playback signal frequency band thereof. In FIG. 7, the range 701 represents an RF playback signal frequency range defined for a CD with respect to the number of revolutions of the optical disc, while the range 702 represents an RF playback signal frequency range defined for a DVD with respect to the number of revolutions of the optical disc.

For example, if a CD is rotated at a rotational velocity of 9,500 rpm as indicated by $V_{CD}$ 703, then the frequency range of the RF playback signal to be detected from the optical disc will be from 18 MHz to 64 MHz as indicated by the arrow 704. On the other hand, if a DVD is rotated at a rotational velocity of 2,000 rpm as indicated by $V_{DVD}$ 705, then the frequency range of the RF playback signal to be detected from the optical disc will be from 18 MHz to 60 MHz as indicated by the arrow 706. Thus, their RF playback signal frequency ranges are almost equal to each other although the disc types and rotational velocities are different from each other.

This means that the equalizer section 105 and PLL section 107 to play these two discs at the respective numbers of revolutions as indicated by $V_{CD}$ 703 and $V_{DVD}$ 705 may have equivalent characteristics. More specifically, this means that the four setting constants of the cutoff frequency setting register 203 and degree-of-boost setting register 204 shown in FIG. 2 and the VCO oscillation frequency setting register 305 and frequency division ratio setting register 306 shown in FIG. 3 are equal to each other between the CD and DVD. Accordingly, by setting the numbers of revolutions of the CD and DVD equal to 9,500 rpm and 2,000 rpm, respectively, the four register values that depend on the RF playback signal frequency range can be used in common. FIG. 8 schematically shows the setting storage table 112. In the situation described above, just four constants need to be stored on the setting storage table 112. If two sets of settings are needed for two types of discs, then eight constants will have to be stored. Thus, compared with such a situation, the number of constants to be stored can be reduced significantly.

Figure 9:
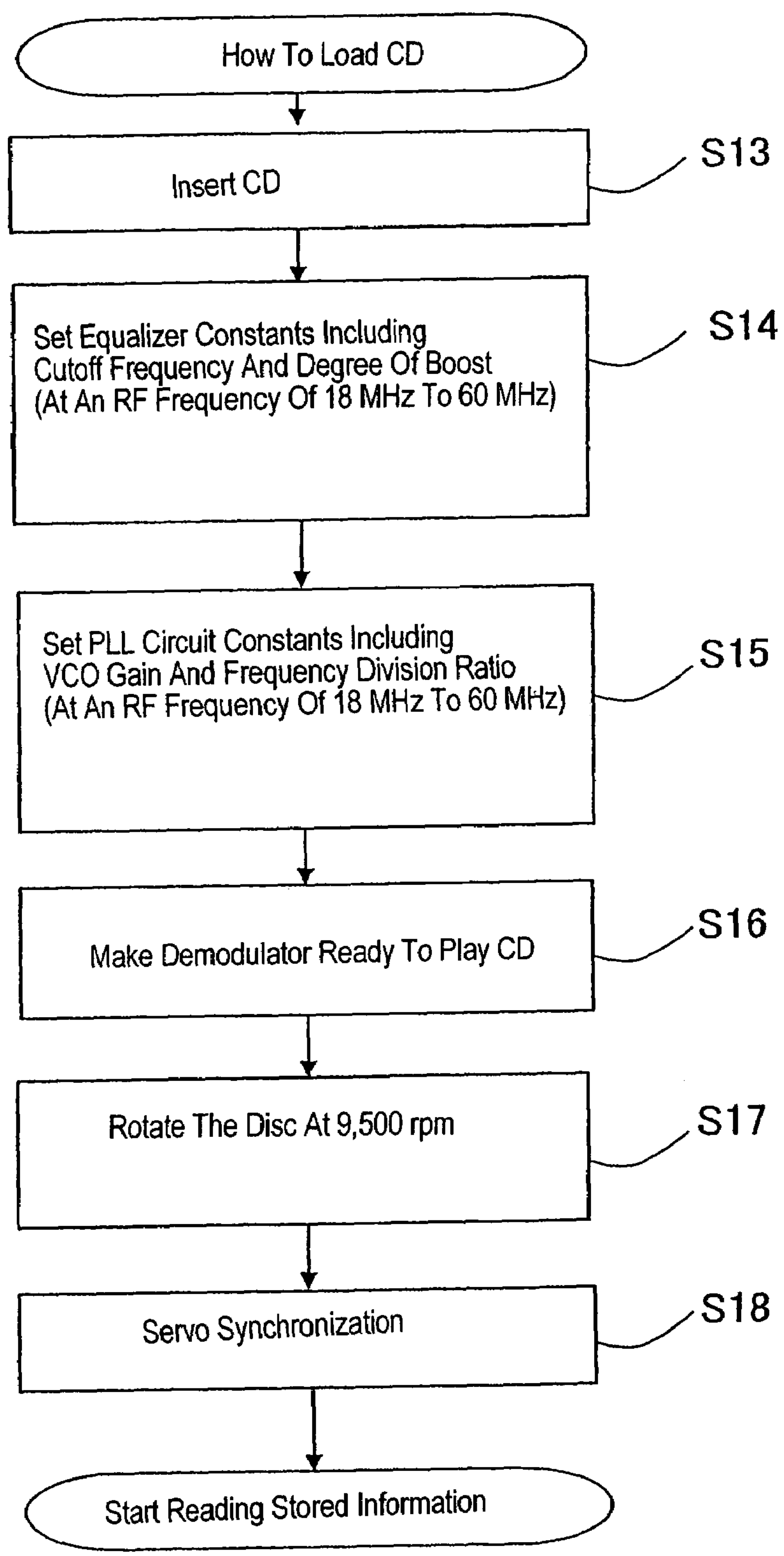
FIG. 9 is a flowchart showing a procedure to load a CD according to this preferred embodiment.
Figure 10:
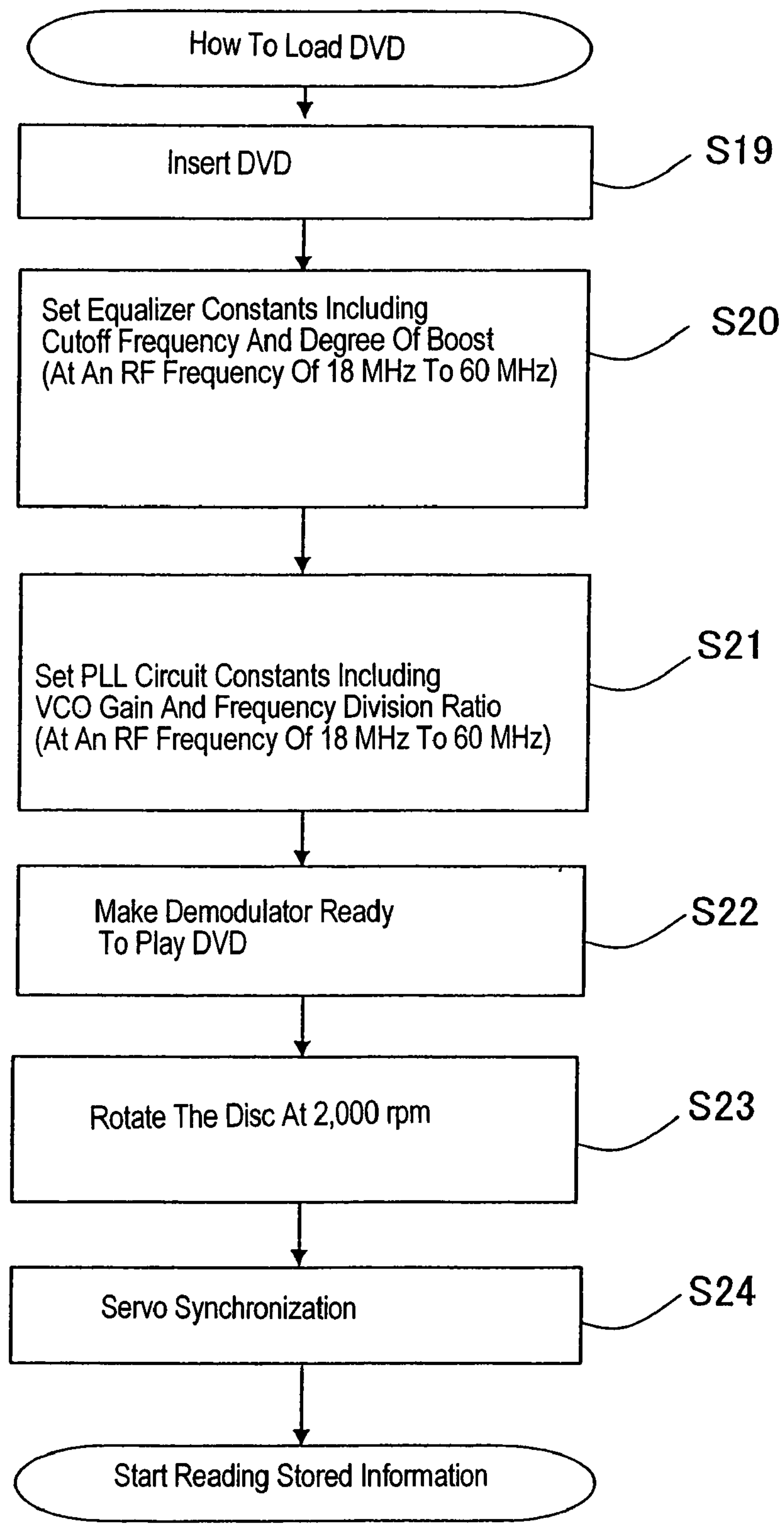
FIG. 10 is a flowchart showing a procedure to load a DVD according to this preferred embodiment.

FIGS. 9 and 10 show a procedure to operate the optical disc drive 11 with these numbers of revolutions adopted. Specifically, FIG. 9 shows a procedure to play a CD, while FIG. 10 shows a procedure to play a DVD.

The frequency range of the RF playback signal obtained by playing a CD is equal to that of the RF playback signal obtained by playing a DVD. Thus, no matter whether the disc to play is a CD or a DVD, the cutoff frequency and degree of boost, which are needed as settings for the playback equalizer section 105, are obtained from addresses Nos. 1 and 2 of the setting storage table shown in FIG. 8 and respectively provided for the cutoff frequency setting register 203 and degree-of-boost setting register 204 shown in FIG. 2 (in Steps S14 and S20). In the same way, the VCO gain and frequency division ratio, which are needed as settings for the PLL section 107, are obtained from addresses Nos. 3 and 4 of the setting storage table 112 and respectively provided for the VCO gain setting register 305 and frequency division ratio setting register 306 shown in FIG. 3 (in Steps S15 and S21). Thereafter, if the disc loaded in the optical disc drive 11 is a CD, then the disc is rotated at 9,500 rpm in Step 17. On the other hand, if the disc loaded is a DVD, then the disc is rotated at 2,000 rpm in Step 23.

As described above, according to this preferred embodiment, even in reading or writing data from/on multiple types of discs, there is no need to provide two lines of signal processors such as equalizer sections and PLL sections for the respective types of discs but their processing is realized using the same circuits in common. In addition, the constants defined for the equalizer and PLL sections to be used in common can also be common. Thus, the setting table to be provided in a ROM or an EEPROM to store those constants can have a smaller capacity. As a result, the hardware scales of the optical disc controller and optical disc drive can be reduced significantly.

EMBODIMENT 2

Figure 11:
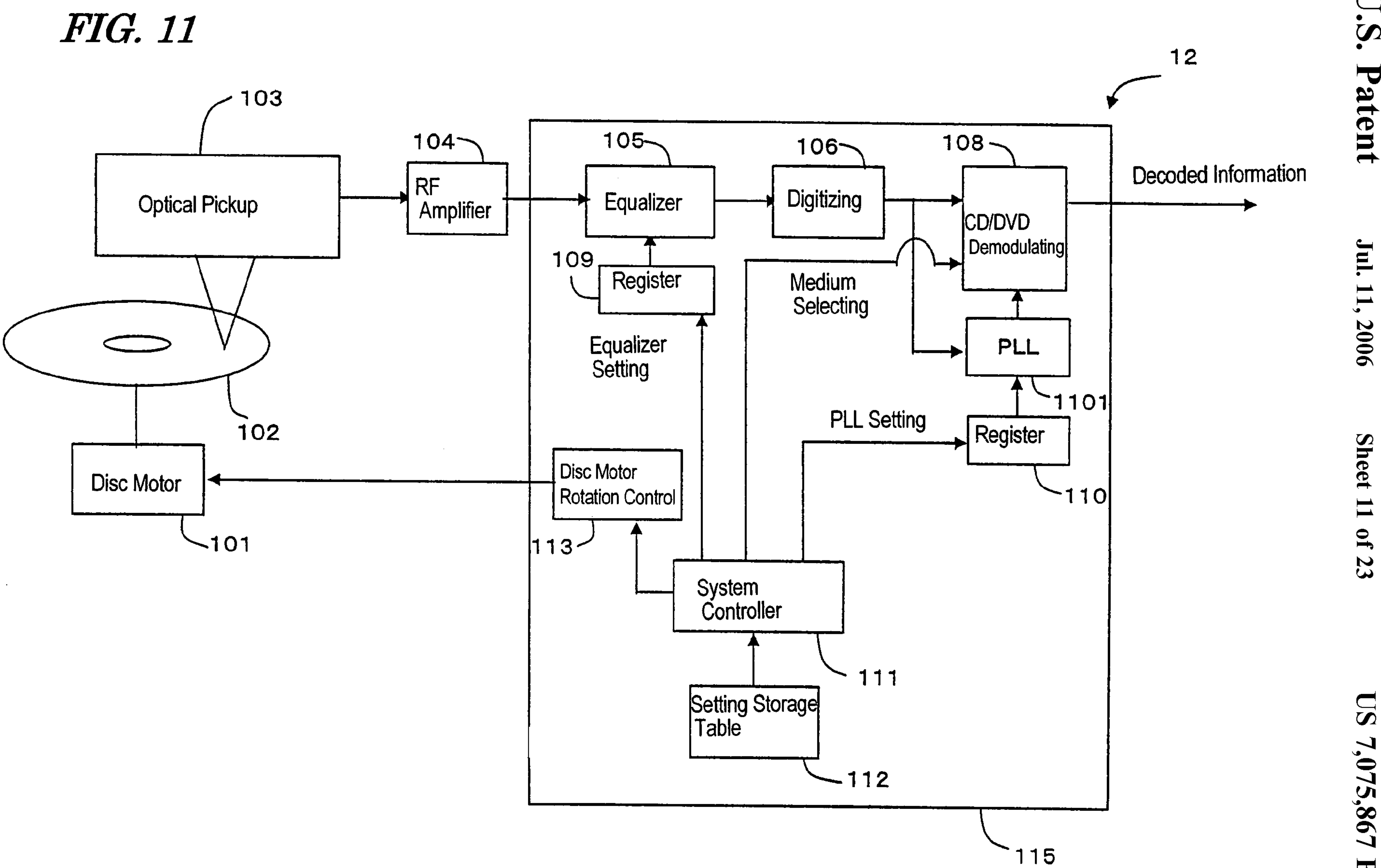
FIG. 11 is a block diagram showing an optical disc drive according to a second embodiment of the present invention.
Figure 12:
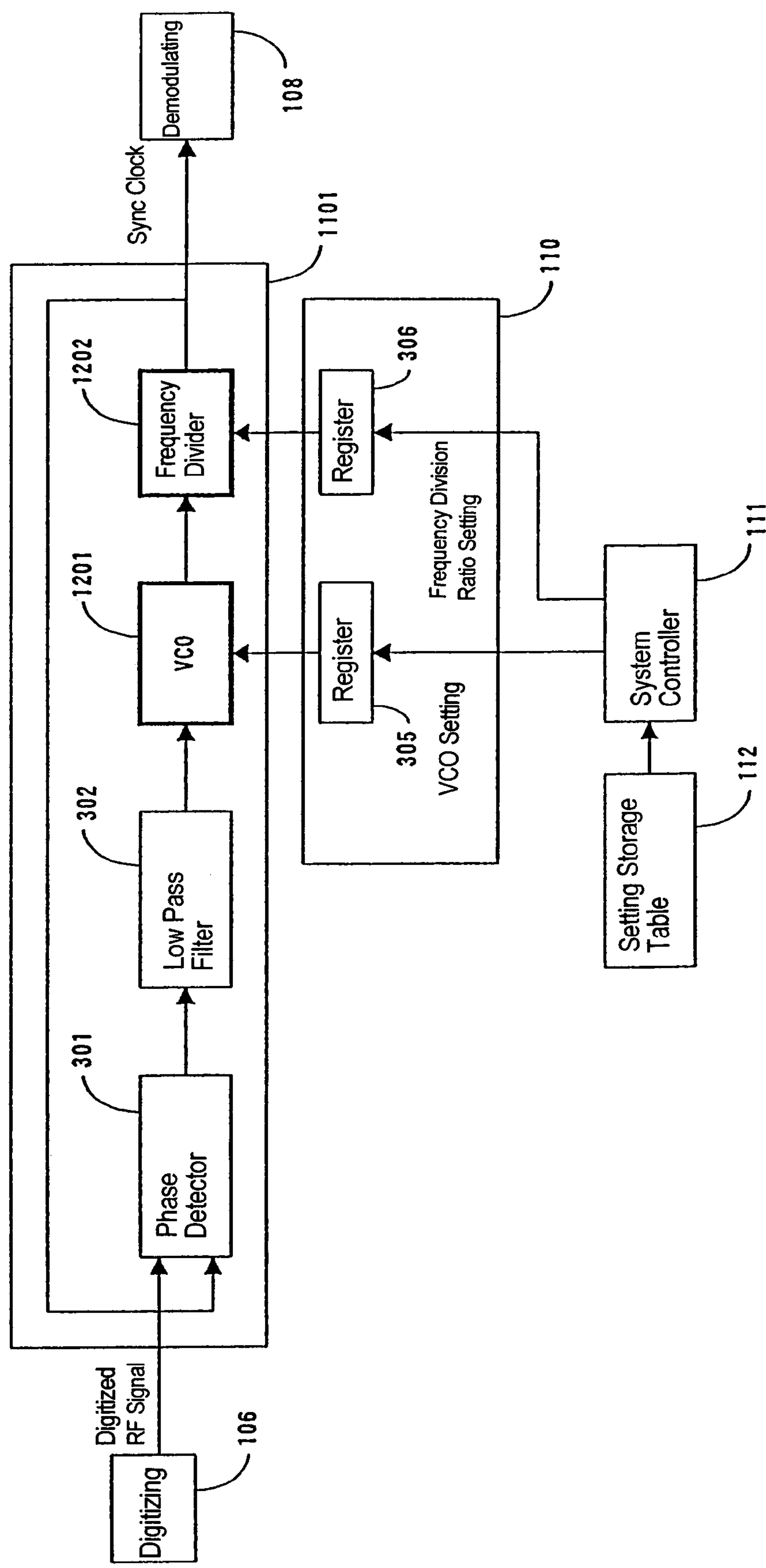
FIG. 12 is a block diagram showing configurations for the equalizer section and register section shown in FIG. 11.

FIG. 11 is a block diagram showing an optical disc drive including an optical disc controller according to a second embodiment of the present invention. In the optical disc drive 12 shown in FIG. 11, any component identical with the counterpart of the optical disc drive 11 of the first embodiment is identified by the same reference numeral. The optical disc drive 12 includes an optical disc controller 115 including a PLL section 1101. FIG. 12 is a block diagram showing a configuration for the PLL section 1101 shown in FIG. 11. In FIG. 12, any component having the same or similar function as the counterpart of the PLL section 107 shown in FIG. 3 is identified by the same reference numeral. As shown in FIG. 12, the PLL section 1101 includes the phase detector 301, the low pass filter 302, a VCO 1201 and a frequency divider 1202.

Figure 13:
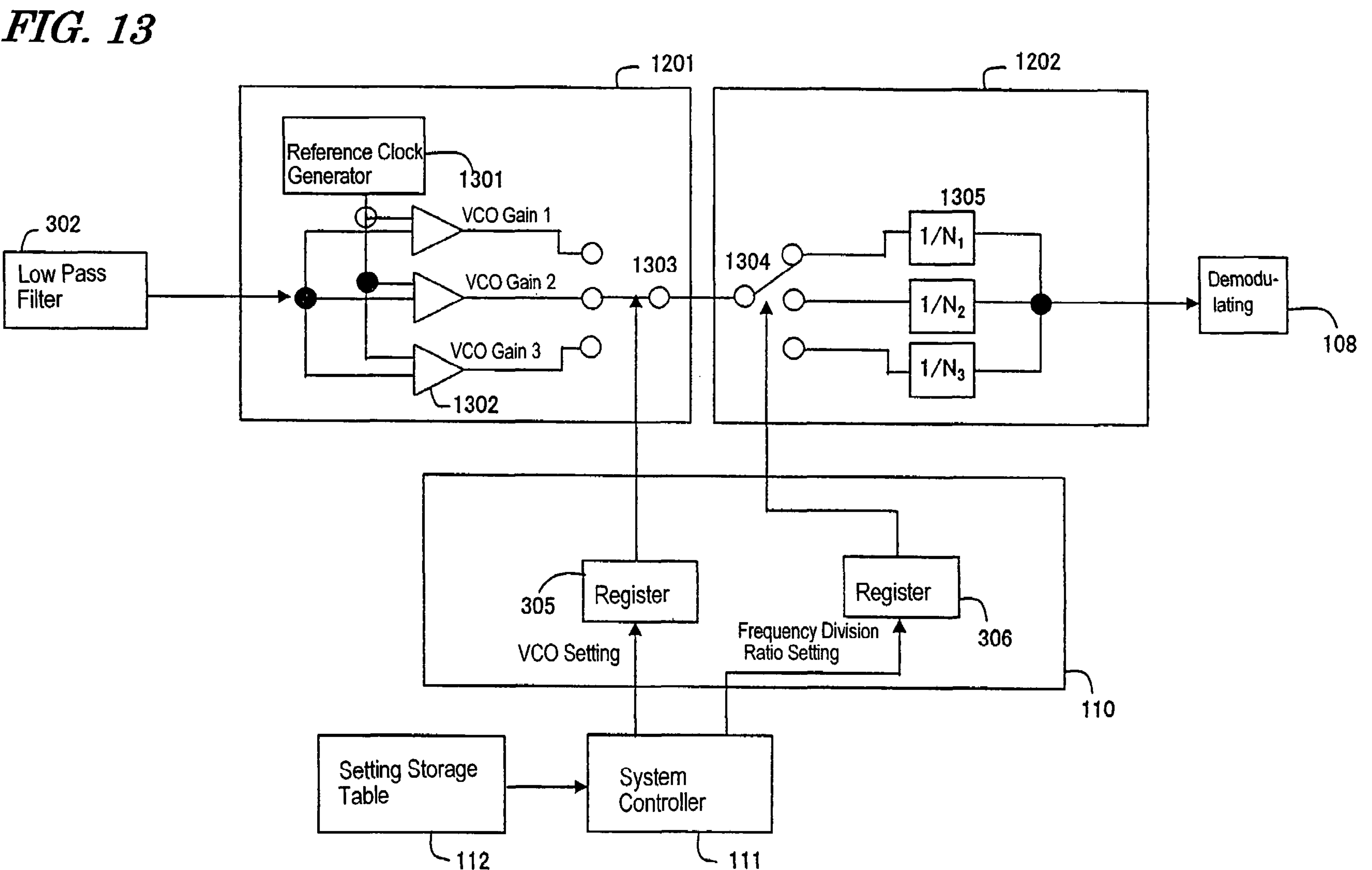
FIG. 13 is a block diagram showing configurations for the VCO section and frequency divider shown in FIG. 12.

FIG. 13 is a block diagram showing configurations for the VCO 1201 and frequency divider 1202. The VCO 1201 includes a reference clock generator 1301 and at least two lines of oscillation frequency control sections 1302. In accordance with the reference signal generated by the reference clock generator 1301 and a control voltage representing the phase difference supplied from the low pass filter 302, the oscillation frequency control sections 1302 generate channel clock frequencies. The channel clock frequency varies with respect to the control voltage and one of the channel clock frequencies is selected by a VCO gain selector 1303 based on the setting of the VCO gain setting register 305.

The reference clock frequency, oscillated by the VCO 1201, is then divided by the frequency divider 1202. The frequency divider 1202 includes at least two lines of frequency divider circuits 1305 with mutually different frequency division ratios. In accordance with the setting of the frequency division ratio setting register 306, a frequency division ratio selector 1304 selects one of the frequency divider circuits 1305 and the reference clock frequency is divided at the frequency division ratio of the selected frequency divider circuit 1305, thereby outputting the resultant channel clock pulse to the demodulating section.

The sync clock signal to be output from the PLL section 1101 is generated by an appropriate combination of oscillation frequency control section 1302 in the VCO 1201 and frequency divider circuit 1305 in the frequency divider 1202 so as to have the same frequency as the reference clock frequency of the RF playback signal to be determined by the transfer rate mode.

Figure 14:
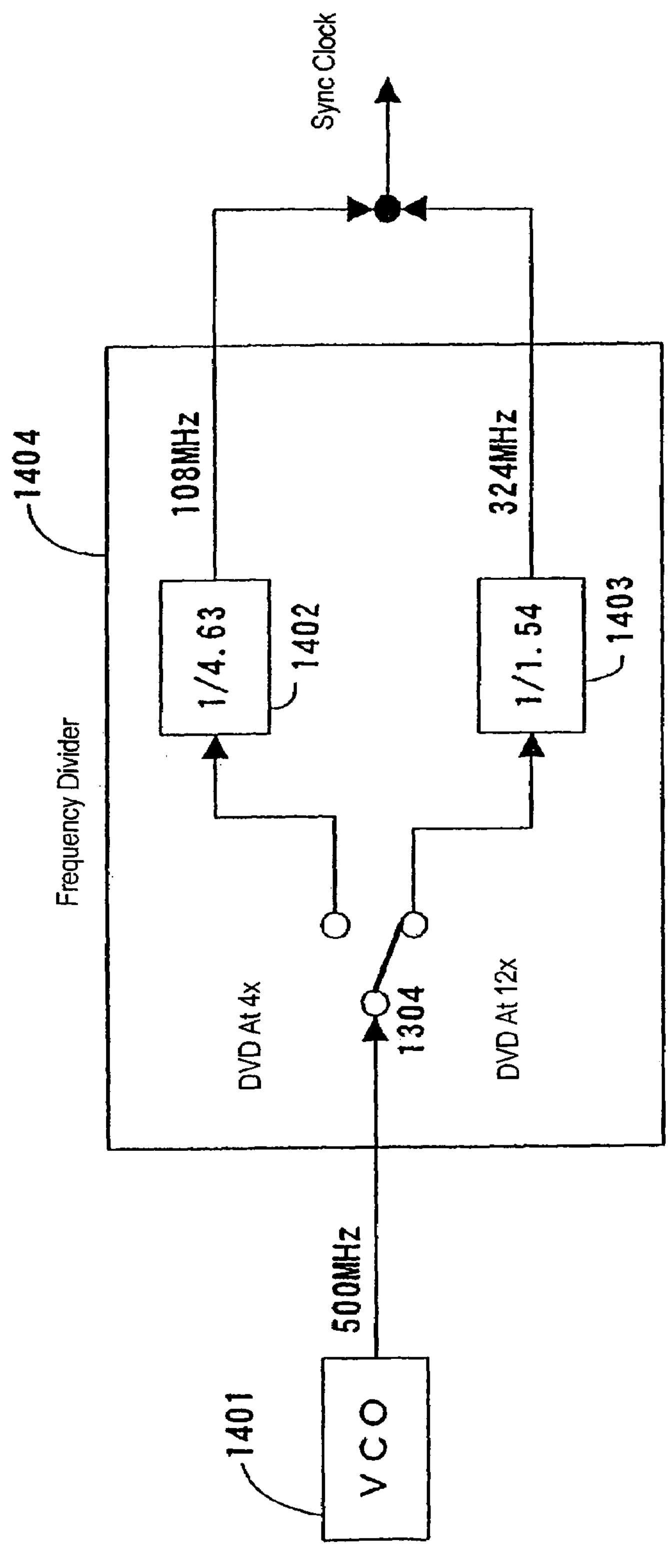
FIG. 14 shows exemplary oscillation frequency and frequency division ratio for the VCO section and frequency divider of the conventional optical disc drive.

A conventional optical disc drive achieves multiple transfer rates, which are higher than the standard transfer rate an integral number of times (e.g., 16×, 8×, 4× and so on). Suppose a conventional optical disc drive includes a PLL section with a VCO 1401 that can oscillate a reference clock frequency of 500 MHz and a frequency divider 1404 as shown in FIG. 14. For this conventional optical disc drive to play a DVD at 4× and 12× transfer rates, a frequency divider for generating a sync clock signal required in respective transfer rate modes from the reference clock signal needs to be prepared. The sync clock signal required at the 4× transfer rate may have a frequency of 108 MHz and the sync clock signal required at the 12× transfer rate may have a frequency of 324 MHz, for example. The frequency division ratios of the frequency divider circuits 1402 and 1403 required to generate these sync clock signals are 1 to 4.63 for the 4× transfer rate and 1 to 1.54 for the 12× transfer rate, respectively. However, since these frequency division ratios are not integral ones, the frequency divider circuits 1402 and 1403 get complicated.

In contrast, in the optical disc drive 12 of this preferred embodiment, the oscillation frequency of the VCO and the frequency division ratio of the frequency divider are determined first, and a transfer rate to be achieved in the outermost area of the disc is selected according to the specific combination of the oscillation frequency and frequency division ratio selected, thereby determining the transfer rate (i.e., × time faster playback operation). Then, the frequency division ratio can always be an integral ratio and the configuration of the frequency divider circuit can be simple enough.

Figure 15:
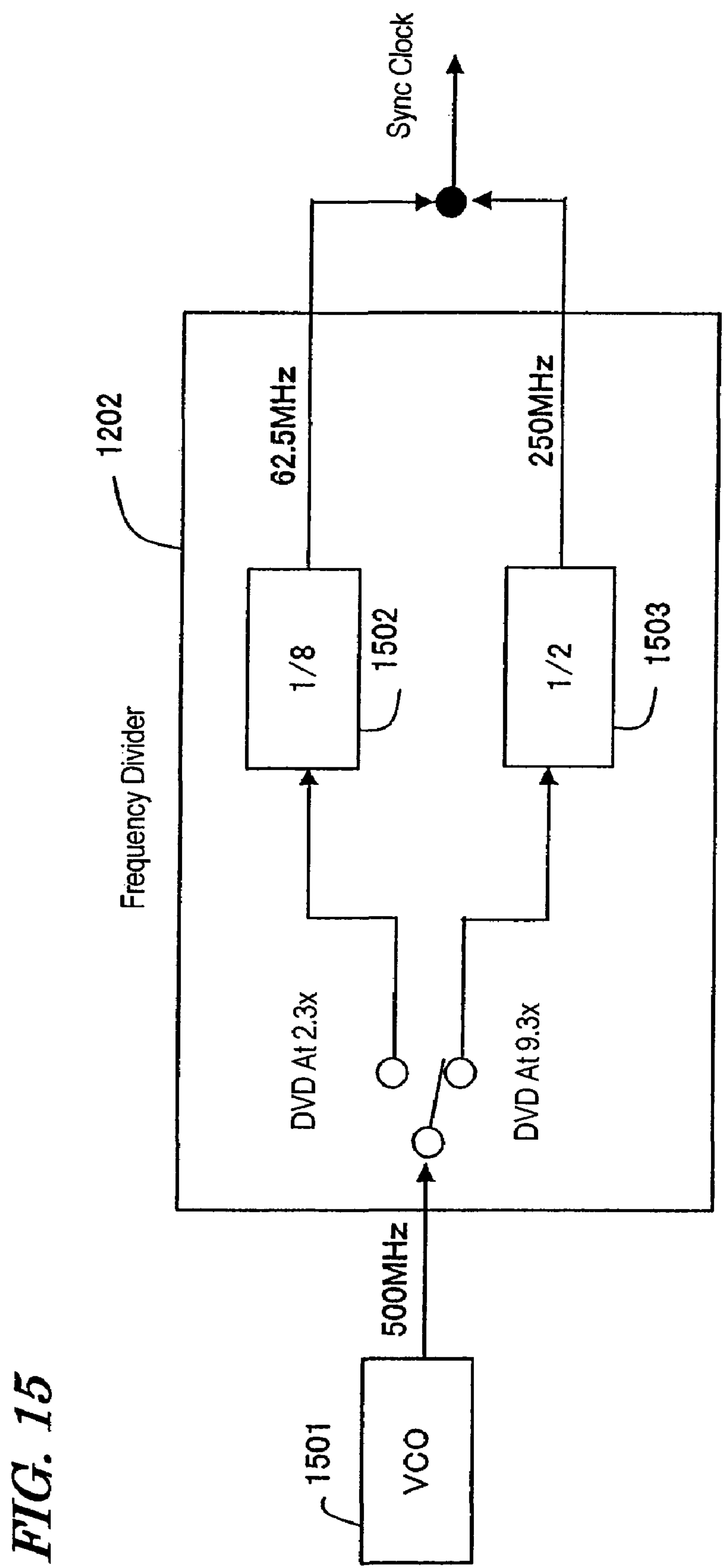
FIG. 15 shows exemplary oscillation frequency and frequency division ratio for the VCO section and frequency divider shown in FIG. 13.

FIG. 15 is a block diagram showing detailed configuration and settings for the frequency divider 1202 shown in FIG. 13. Suppose the VCO 1501 has a reference clock frequency of 500 MHz and the frequency divider circuits 1502 and 1503 have frequency division ratios of 1 to 8 and 1 to 2, for example, to simplify the circuit configuration. The sync clock signal that can be generated by this combination has a frequency of 62.5 MHz for the frequency division ratio of 1 to 8 and a frequency of 250 MHz for the frequency division ratio of 1 to 2, respectively. These settings can be translated into 2.3 and 9.3, respectively, when converted into the multipliers of the DVD standard transfer rate. Thus, these non-integral numbers of 2.3 and 9.3 are adopted herein as the DVD transfer rates, which form a part of the specifications of the optical disc drive 12.

However, even if these non-integral numbers are adopted as the multipliers of the transfer rate, the operation of the optical disc drive 12 will be hardly affected substantially. For example, compared with a conventional optical disc drive that can play a DVD at 2× and 9× transfer rates, no significant difference is recognized between their performances. This is because no matter whether the transfer rate is 2 or 2.3 times as high as the standard transfer rate, each of these transfer rates is high enough to correct data errors to be produced while information is being retrieved from the DVD.

As described above, according to this preferred embodiment, even if an optical disc drive should cope with multiple disc types and a plurality of transfer rate modes, it is also possible to prevent its PLL section, including a VCO and a frequency divider, from increasing its circuit scale without affecting the performance of the drive substantially.

EMBODIMENT 3

Figure 16:
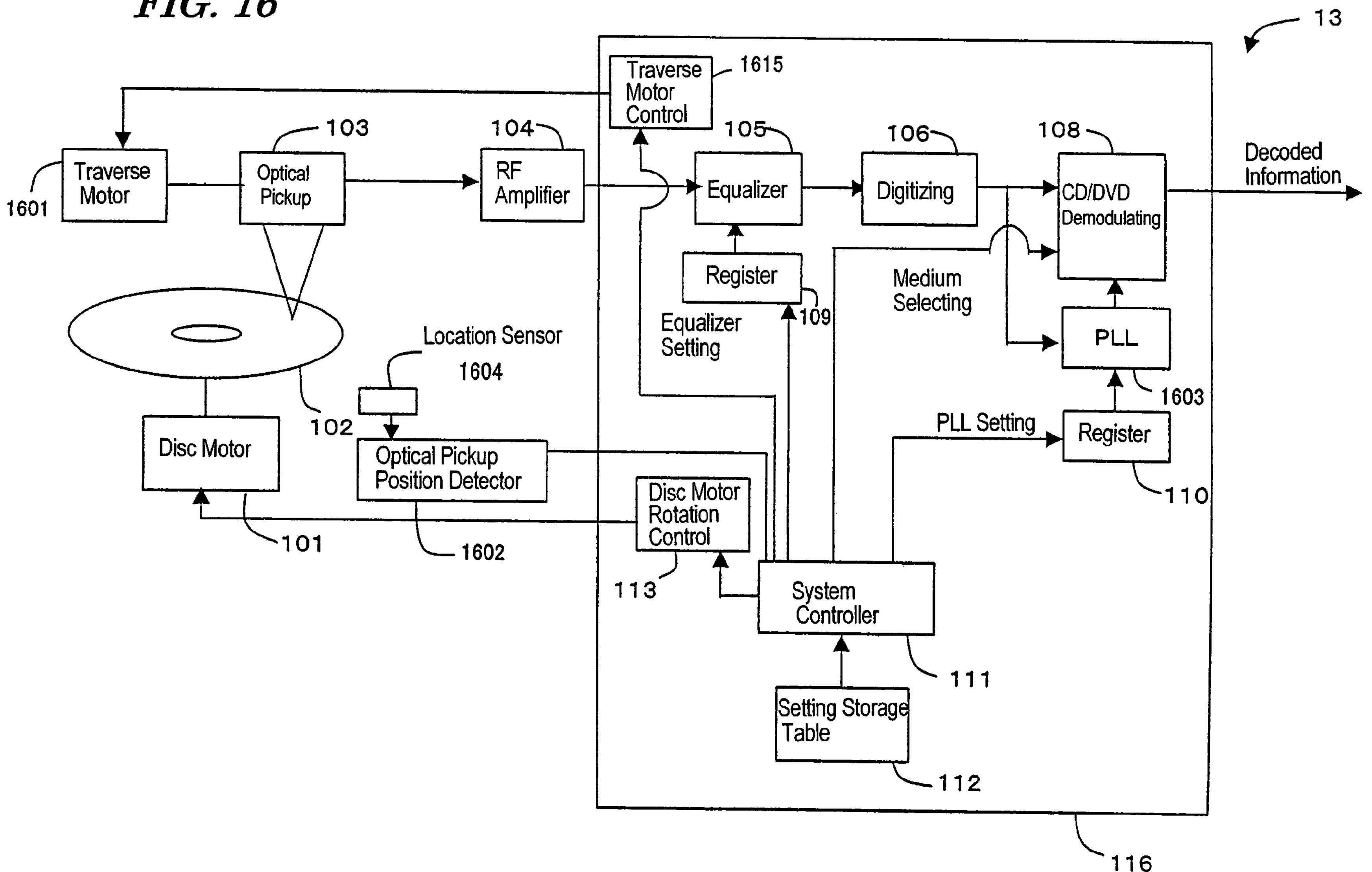
FIG. 16 is a block diagram showing an optical disc drive according to a third embodiment of the present invention.
Figure 17:
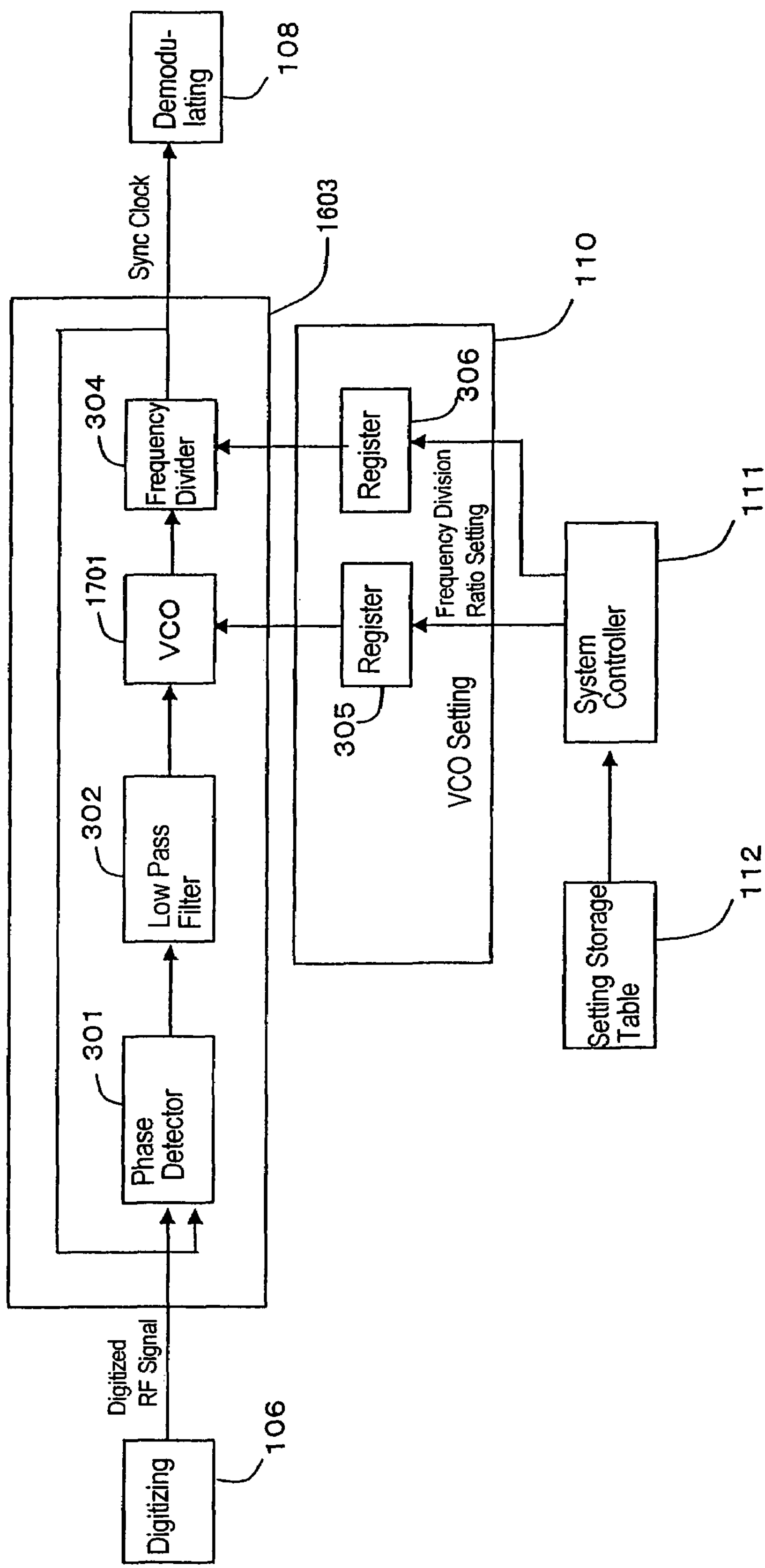
FIG. 17 is a block diagram showing configurations for the equalizer section and register section shown in FIG. 16.

FIG. 16 is a block diagram showing an optical disc drive including an optical disc controller according to a third embodiment of the present invention. In the optical disc drive 13 shown in FIG. 16, any component identical with the counterpart of the optical disc drive 11 of the first embodiment is identified by the same reference numeral. FIG. 17 is a block diagram showing a configuration for the PLL section 1603 of the optical disc drive 13.

The optical disc drive 13 performs a read operation by rotating the optical disc 102 by the CAV method. The optical disc drive 13 includes a traverse motor 1601, a traverse motor control section 1615 for controlling the traverse motor 1601, a location sensor 1604 and an optical pickup position detector 1602. The optical pickup 103 is moved to an arbitrary radial location on the optical disc 102 by the traverse motor 1601, which functions as the moving mechanism, thereby reading information. In the CAV method, the transfer rate changes with a specific read location on the optical disc 102. Accordingly, the sync clock frequency of the PLL section 1603 also needs to be changed with the transfer rate.

For that purpose, the on-disc location specified by the optical pickup 103 is detected by the location sensor 1604 and optical pickup position detector 1602. The result of this detection, i.e., information about the radial location of the optical pickup, is provided to the system controller 111.

Alternatively, instead of providing the location sensor 1604 and optical pickup position detector 1602, the address information recorded on the optical disc 102 may be read so that the information about the position of the optical pickup is drawn from the address information.

In a conventional CAV optical disc drive, disc read locations are classified into a number of radial zones, and the VCO gain and frequency division ratio are sequentially switched whenever each of those zones starts to be read, thereby setting the sync clock frequency of the PLL section into the best value on purpose. According to such a method, the same number of setting constant sets as that of those zones need to be prepared for the PLL section. For example, if the optical disc is divided into six radial zones, storage table areas of 12 bytes are needed for a single transfer rate mode of a single optical disc as shown in FIG. 18. Accordingly, if the optical disc drive should cope with multiple types of optical discs and a plurality of transfer rate modes, then the table areas for storing the setting constants to be given to the PLL section will expand significantly.

Also, in the PLL section, the channel clock pulses are oscillated by the VCO so as to have its frequency defined, responsive to the reference clock signal, within a frequency range that achieves the oscillation even if the transfer rate has changed to a certain degree. Such a frequency range is called a "locking range (or locked frequency range)". However, if the locking range were defined arbitrarily, then the VCO might stop oscillating and the PLL might unlock and require re-locking while the optical pickup is accessing a target location from an inside portion of the optical disc to an outside portion thereof, or vice versa. In that case, the access time will become much longer.

In the optical disc drive 13 of this preferred embodiment, the PLL section 1603 is designed such that the ratio of the lower limit of the frequency range of the channel clock pulses, which are oscillated by the VCO and of which the frequency is divided by the frequency divider, to the upper limit thereof is equal to the ratio of the radius of a beginning of data location on the innermost area of the disc to that of an end of data location on the outermost area thereof, and the settings of the PLL section 1603 are unified over the entire area of the disc, thereby realizing a CAV read operation.

Figure 19:
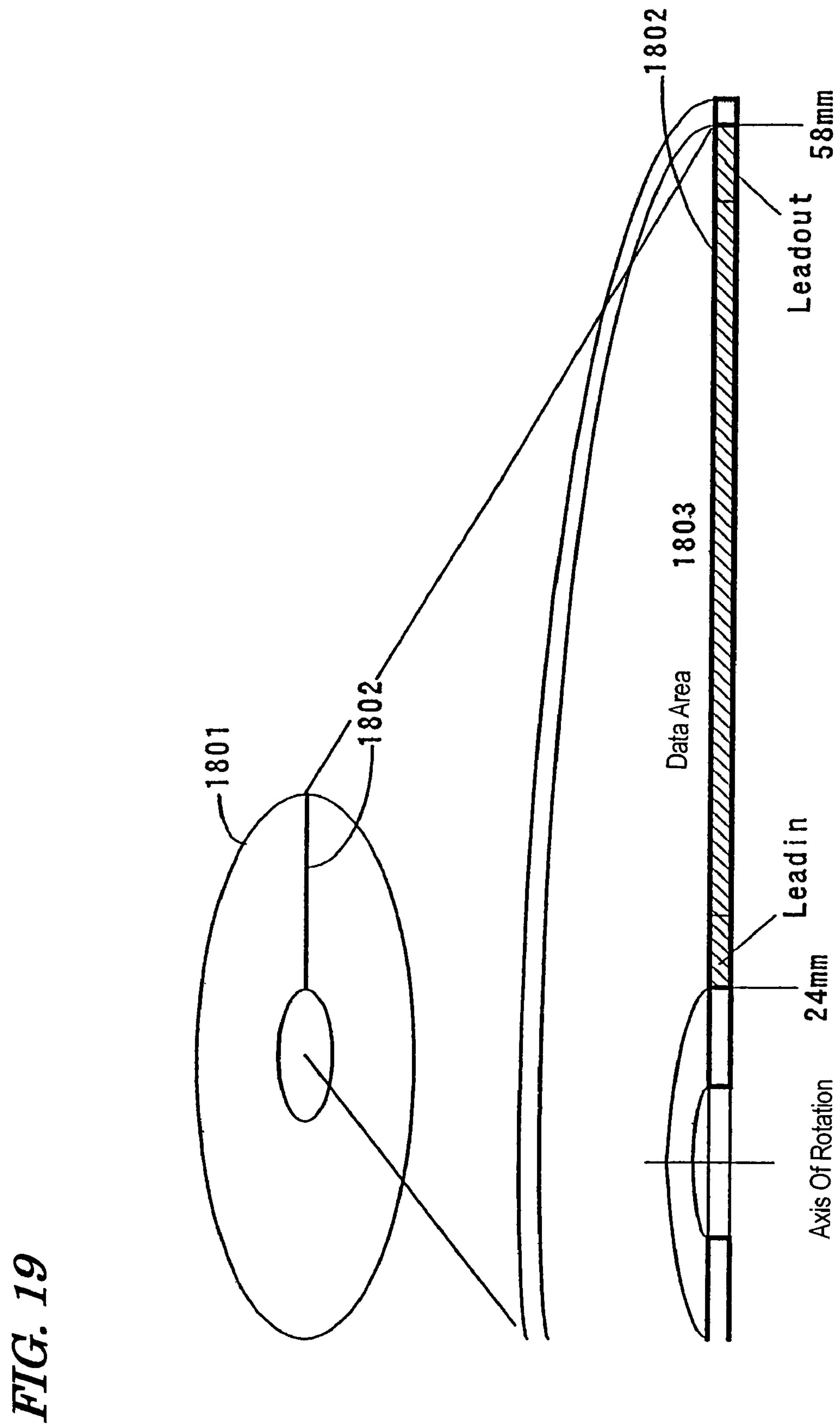
FIG. 19 schematically illustrates the structure of an optical disc.

FIG. 19 schematically illustrates a single-layer DVD disc 1801. As shown in FIG. 19, information, including Leadin and Leadout, is stored on an information storage area 1803, which ranges from a radial location of 24 mm to a radial location of 58 mm, on this DVD disc 1801. In retrieving information from this disc in a 5× transfer rate mode by the CAV method, the RF playback signal has a frequency range of 1.9 MHz to 9 MHz and the required channel clock frequency is 54 MHz at the radial location of 24 mm. On the other hand, at the radial location of 58 mm, the RF playback signal has a frequency range of 4.6 MHz to 21.6 MHz and the required channel clock frequency is 130 MHz. The ratio of the outermost radius of the disc to the innermost radius thereof (i.e., 58/24) and the ratio of the channel clock frequencies (i.e., 130/54) are approximately equal to each other and both about 2.4.

That is to say, by defining the locking range of the PLL section 1603 from 50 MHz to 130 MHz and by equalizing the ratio of the upper limit frequency to the lower limit frequency thereof with the ratio of the outermost radius of the information storage area of the disc to the innermost radius thereof (e.g., about 2.4 in this case), information can be retrieved from the entire area of the disc with just a single set of PLL settings. As a result, the circuit constants to be defined for the PLL section can also be reduced to 10 bytes for a single transfer rate mode of a single disc as shown in FIG. 20.

Thus, according to this preferred embodiment, just a single set of constants may be set for the PLL section in the CAV method, in particular. Accordingly, the setting table in a ROM or an EEPROM can be downsized and the overall hardware scale can be reduced significantly. Also, in accessing an arbitrary track in the radial direction, there is no need to make special settings for that access location. As a result, the access time can be shortened effectively.

EMBODIMENT 4

FIG. 21 is a block diagram showing an optical disc drive including an optical disc controller according to a fourth embodiment of the present invention. In the optical disc drive 14 shown in FIG. 21, any component identical with the counterpart of the optical disc drive 13 of the third embodiment is identified by the same reference numeral.

The optical disc drive 14 adopts CLV read and write methods to perform a read (playback) operation and a write (recording) operation simultaneously (which is the so-called "simultaneous record and play" function) and to start a playback operation of a recorded program from the beginning even before the recording operation of the program is finished (which is the so-called "chasing play back" function), among other things.

The optical disc drive 14 includes a playback buffer memory 1613 for temporarily storing the decoded data supplied from the demodulating section 108. The data once stored in the playback buffer memory 1613 is sequentially transferred to the host computer 1614. The optical disc drive 14 further includes a write circuitry for writing data on the optical disc 102. Specifically, the optical disc drive 14 includes a recording buffer memory 1612, a modulating section 1611 and an LD driver section 1610.

The write data, output from the host computer 1614, is temporarily stored in the buffer memory 1612. The modulating section 1611 receives the data that has been stored in the recording buffer memory 1612 and modulates the data by a predetermined modulating method. Next, the modulated data is output to the laser diode driver section 1610, which is provided to energize a writing light source (not shown) included in the optical pickup 103. The laser diode driver section 1610 makes the writing light source emit a light beam by supplying a drive signal thereto. By irradiating the storage layer of the optical disc 102 with the light beam emitted, data can be written on the storage layer of the optical disc 102.

The optical disc drive 14 of this preferred embodiment adopts the read and write techniques to be described below. In the following illustrative example, the optical disc drive is supposed to perform a write operation at an inside location on the optical disc and a read operation at an outside location on the optical disc. Alternatively, the optical disc drive may perform a read operation at an inside location on the optical disc and a write operation at an outside location on the optical disc.

Figure 22:
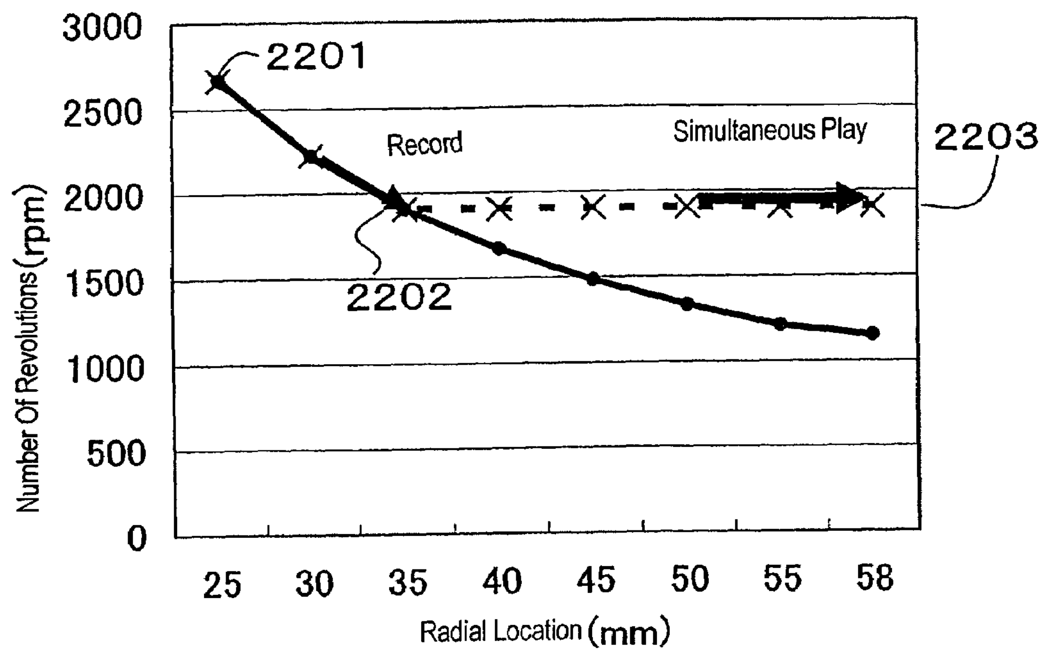
FIG. 22 shows a procedure to perform read and write operations according to this preferred embodiment.

As shown in FIG. 22, suppose information starts being written (e.g., video information of a broadcast program starts being recorded) on a first radial location 2201, which is defined by a radius of 25 mm, and at the same time, information (e.g., another video information) is read from another radial location 2203, which is located closer to the outer edge than the first location is and which is defined by a radius of 50 mm. In that case, first, the optical pickup 103 is moved to the first location 2201 with the radius of 25 mm and the optical disc is rotated at 2,668 rpm, thereby starting the write operation. At this point in time, the transfer rate for the write operation is higher than the standard write transfer rate and the data to be written has already been sufficiently stored in the recording buffer memory 1612.

At the first location (i.e., the location 2201 defined by the radius of 25 mm), the write operation is carried out by the CLV method. Accordingly, as the write operation advances, the number of revolutions of the optical disc 102 is decreased gradually as shown in FIG. 22. Since the transfer rate for the write operation is higher than the standard write transfer rate, the amount of data stored in the recording buffer memory 1612 decreases. For example, when the amount of data stored in the recording buffer memory 1612 becomes either equal to zero or less than a predetermined value at a location 2202 defined by a radius of 35 mm of the optical disc 102, the write operation may be stopped and the optical pickup 103 may be moved to the location defined by the radius of 50 mm. In this case, the system controller 111 does not instruct the disc motor rotation control section 113 to change the number of revolutions of the disc. Thus, the information is read out from the location 2203, defined by the radius of 50 mm, with the rotational velocity of 1,905 rpm for the location 2202 of the radius of 35 mm maintained.

At the second location (i.e., the location 2203 defined by the radius of 50 mm), the read operation is carried out by the CAV method. Considering the rotational velocity at this radial location, the transfer rate for the read operation is higher than the standard CLV read transfer rate. Accordingly, the read transfer rate is higher than the transfer rate required by the host computer 1614. As a result, data is sequentially stored on the playback buffer memory. The data is continuously read from the location 2203 with the radius of 50 mm until the amount of read data stored in the playback buffer memory 1613 exceeds a predetermined value. In the meantime, the data to be written is sequentially stored in the recording buffer memory 1612.

When the data has been stored in the playback buffer memory 1613, the optical pickup is moved back to the location 2202 with the radius of 35 mm to write the data on the optical disc 102 again. In this case, since the number of revolutions of the disc motor remains 1,905 rpm, the write operation can be started again as soon as the optical pickup gets back to the location 2202 with the radius of 35 mm. The data that has been stored while the read operation was performed is read out from the recording buffer memory 1612 and the write operation by the CLV method is started again. In the meantime, the data that has been stored in the playback buffer memory 1613 is transferred to the host computer 1614 and played back sequentially. The chasing play back or simultaneous record and play operation is carried out by repeating this processing.

Most of various recordable or rewritable DVDs such as a DVD-RAM and a DVD-RW adopt the CLV technique in its read and write methods. Thus, for a conventional drive to perform the chasing play back or simultaneous record and play operation, the number of revolutions of the disc motor needs to be switched. However, the motor ordinarily has a slow response speed. Also, as for a 12 cm DVD, the number of revolutions in the inside portion thereof is higher than that in the outside portion by as much as 2.4 times. For that reason, it takes a long time to stabilize the number of revolutions of the motor to a predetermined number after it has been changed once. Accordingly, to perform the chasing play back or simultaneous record and play operation, the capacities of the buffer memories for temporarily storing the read and write data need to be increased. Furthermore, since it is necessary to change the numbers of revolutions of the motor so often, the motor generates significant heat or noise, thus deteriorating its reliability and usability (or quality).

According to this preferred embodiment, however, a read or write operation is performed by the CLV method at a first location and a write or read operation is performed by the CAV method at a second location, which is closer to the outer edge than the first location is, with the rotational velocity at the first location maintained. In performing the read or write operation by moving the optical pickup back and forth between the first and second locations, the rotational velocity of the optical disc remains the same. Accordingly, there is no need to take time to stabilize the rotational velocity of the motor. Thus, as soon as the optical pickup reaches the first or second location, the read or write operation can be started immediately. As a result, the capacities of the recording and playback buffer memories can be decreased and the cost of the optical disc drive can be reduced. In addition, even in performing the simultaneous record and play or chasing play back operation, the quantity of heat generated by the motor can be minimized and the optical disc drive can be operated quietly.

In the preferred embodiment described above, a read or write operation is performed by the CLV method at a first location and a write or read operation is performed by the CAV method at a second location, which is closer to the outer edge than the first location is, with the rotational velocity at the first location maintained. However, if the CLV read or write operation is performed at the first location at a transfer rate that is at least 2.4 times as high as the standard transfer rate, then the second location can be closer to the inner edge than the first location is.

Figure 23:
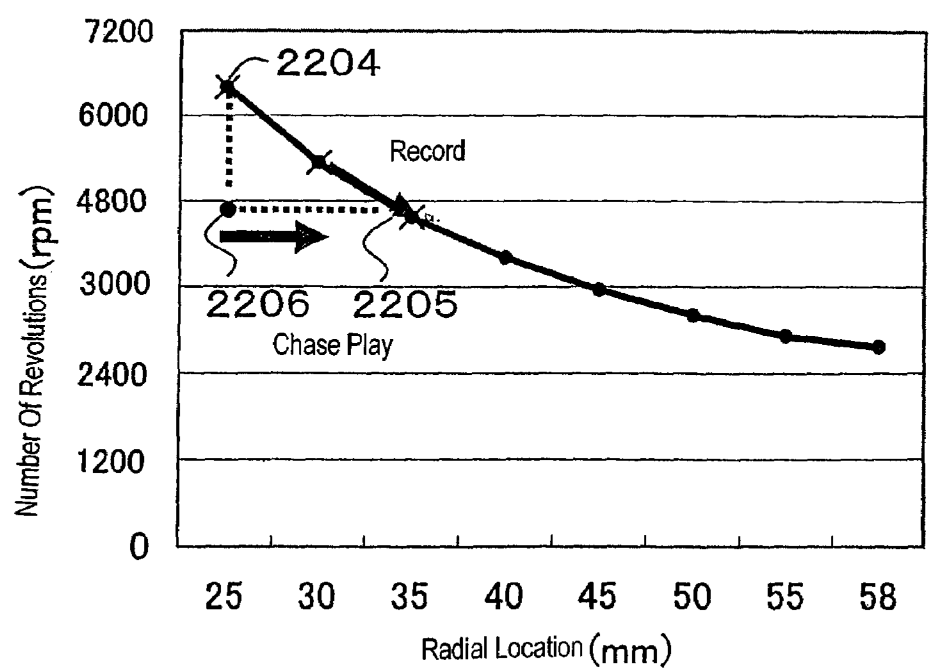
FIG. 23 shows another procedure to perform read and write operations according to this preferred embodiment.
Figure 24:
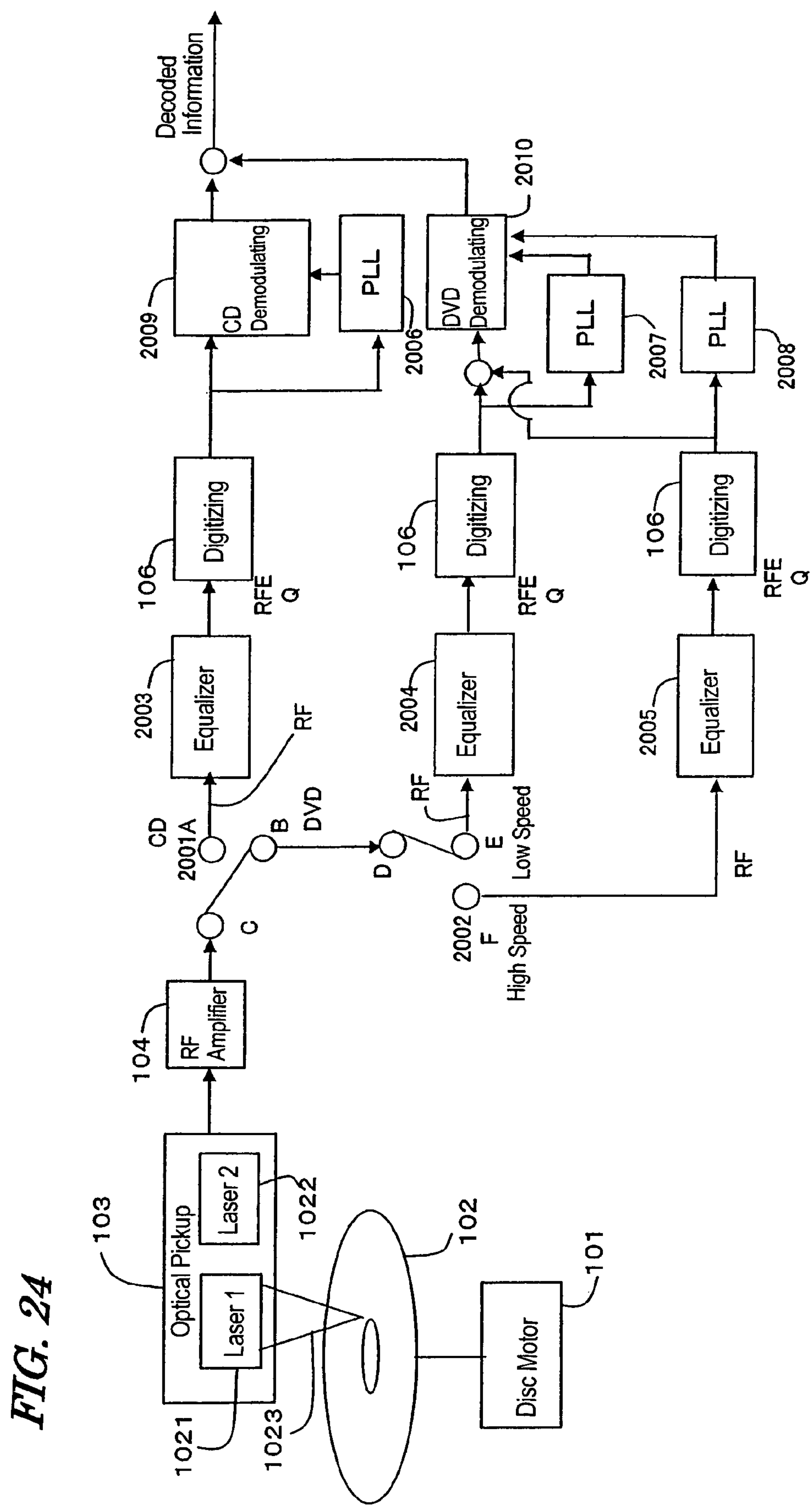
FIG. 24 is a block diagram showing a conventional optical disc drive.

For example, suppose a write operation by the CLV method is started at a radial location of 25 mm at 6,403 rpm resulting in a transfer rate that is 2.4 times as high as the standard transfer rate as shown in FIG. 23. The write operation is performed by the CLV method. Accordingly, when the optical pickup reaches the first location 2205 with the radius of 35 mm, the rotational velocity will be 4,572 rpm, which results in a transfer rate that is 2.4 times as high as the standard transfer rate at that location.

Once the optical pickup has reached the first location 2205 with the radius of 35 mm, the optical pickup is moved back to the second location 2204 with the radius of 25 mm, thereby reading the information stored. In this case, the rotational velocity of the motor is not changed but maintained at 4,572 rpm and the read operation is performed by the CAV method (i.e., a combination of the radial location 2206 and the number of revolutions as indicated by the dotted lines).

As shown in FIG. 23, the number of revolutions that results in the 2.4× transfer rate for the CLV method at the radial location 2204 with the radius of 25 mm is 6,403 rpm. However, even if the read operation is performed at the number of revolutions of 4,572 rpm, a transfer rate that is 1.7 times as high as the standard transfer rate can still be obtained. Accordingly, it is possible to avoid a situation where zero data at the playback buffer discontinues the information being read. Such a procedure is particularly suitable to the chasing play back operation for reading written data while performing a write operation.

The preferred embodiments described above may be effectively combined with each other. For example, by combining the first and second preferred embodiments, the optical disc drive 11 may be provided with a frequency divider with an integral frequency division ratio. Alternatively, by combining the first and third preferred embodiments, the optical disc drive 11 may be designed such that the frequency ratio of the locking range of the PLL section is equal to the ratio (2.4) of the outermost radius to the innermost radius of the information storage area of the disc. As another alternative, by combining the first and fourth preferred embodiments, the disc motor and traverse motor may be controlled such that the optical disc drive 11 can perform read and write operations by a combination of CLV and CAV methods to achieve the simultaneous record and play or chasing play back function.

Furthermore, a combination of the second and third preferred embodiments and any other combination may also be adopted effectively.

Although not illustrated specifically for the first through fourth preferred embodiments, methods for controlling an optical disc drive according to the first through fourth preferred embodiments of the present invention described above may be carried out either by using hardware components such as circuits made up of electronic parts or by a microcomputer or the host computer of the optical disc drive. In the latter case, a computer readable program (firmware) that is defined so as to carry out the procedure described above is stored in an information storage medium such as an EEPROM or a RAM.

INDUSTRIAL APPLICABILITY

An optical disc controller and an optical disc drive according to the present invention can perform a read or write operation on multiple types of discs without providing two or more lines of signal processors such as equalizer sections or PLL sections for each disc but with common circuits. In addition, the constants to be defined for the equalizer and PLL sections can also be common, thus minimizing the setting table for a ROM or an EEPROM and reducing the hardware scale significantly.

Also, even if the optical disc controller and optical disc drive of the present invention can cope with multiple types of discs or a plurality of transfer rate modes, the circuit size of the PLL section thereof, including a VCO and a frequency divider, can still be reduced.

Furthermore, the optical disc controller and optical disc drive of the present invention need just one set of settings for the PLL section even in the CAV playback mode, thus minimizing the setting table for a ROM or an EEPROM and reducing the hardware scale significantly.

Furthermore, the optical disc controller and optical disc drive of the present invention can reduce the capacities of recording and playback buffer memories in performing read and write operations simultaneously or in sequentially reading written data while continuing a write operation.

The invention claimed is:

1. An optical disc controller for use in an optical disc drive that plays optically a first information storage medium and a second information storage medium having a higher storage density than that of the first information storage medium, the optical disc controller comprising:

a rotation control section for controlling a rotating mechanism that rotates the first and second information storage media;

an equalizer for removing first frequency range components from an RF playback signal, obtained by irradiating each of the first and second information storage media with light and detecting light reflected therefrom, and for amplifying the amplitude of second frequency range components thereof; and a phase locking section for generating a sync clock signal to do synchronization detection with respect to a digital playback signal that is obtained by digitizing the output of the equalizer, wherein the rotation control section rotates the first and second information storage media while controlling the rotating mechanism such that RF playback signals are obtained at a first transfer rate and at a second transfer rate, respectively, and wherein the maximum playback frequency of the RF playback signal obtained from the first information storage medium at the first transfer rate is substantially equal to that of the RF playback signal obtained from the second information storage medium at the second transfer rate.

2. The optical disc controller of claim 1, wherein supposing channel clock frequencies of the first and second information storage media are A and B, respectively, the second transfer rate is n (where $1 \leqq n$) times as high as a standard transfer rate of the second information storage medium and the first transfer rate is $n \times (B/A)$ times as high as a standard transfer rate of the first information storage medium.

3. The optical disc controller of claim 1, wherein the rotation control section controls the rotating mechanism such that the first and second information storage media rotate at a constant linear velocity.

4. The optical disc controller of claim 1, wherein the rotation control section controls the rotating mechanism such that the first and second information storage media rotate at a constant angular velocity.

5. The optical disc controller of claim 1, wherein the equalizer is operated by being provided with a pair of setting constants that defines the first and second frequency ranges, respectively, and wherein the same pair of setting constants is applied to the first and second frequency ranges either at the first transfer rate or at the second transfer rate.

6. The optical disc controller of claim 1, wherein the phase locking section includes a voltage controlled oscillator and a frequency divider, which are operated at respective predetermined frequencies by being provided with their setting constants, and wherein the same pair of setting constants is provided for the voltage controlled oscillator and the frequency divider either at the first transfer rate or at the second transfer rate.

7. The optical disc controller of claim 1, wherein the phase locking section includes a frequency divider for dividing the frequency by an integer.

8. The optical disc controller of claim 1, wherein the optical disc drive also performs a write operation on the first and second information storage media, and wherein the optical disc controller further includes a movement control section for driving a moving mechanism that moves an optical pickup in a radial direction of the first or second information storage medium, the optical pickup being used to read or write a signal from/on the first and second information storage media, and wherein the movement control section and the rotation control section control the moving mechanism and the rotating mechanism, respectively, such that after a read or write operation has been performed on the first or second information storage medium for a predetermined period of time at a constant linear velocity for a first location in the radial direction while the first or second information storage medium is being rotated at a first rotation velocity so as to achieve a transfer rate that is higher than a standard read or write rate for the first or second information storage medium, a write or read operation is performed on the first or second information storage medium at the first rotation velocity and at a constant angular velocity for a second location.

9. The optical disc controller of claim 8, wherein the second location is closer to the outer edge of the information storage medium than the first location is.

10. The optical disc controller of claim 8, wherein the second location is closer to the inner edge of the information storage medium than the first location is, and wherein the transfer rate at the first location is at least 2.4 times as high as the standard transfer rate.

11. An optical disc drive comprising:

an optical pickup for obtaining RF playback signals by irradiating a first information storage medium and a second information storage medium, having a higher storage density than that of the first information storage medium, with light and detecting light reflected therefrom;

a rotating mechanism for rotating the first and second information storage media; and the optical disc controller of claim 1.

12. An optical disc drive comprising:

an optical pickup for writing a signal on a first information storage medium and a second information storage medium, having a higher storage density than that of the first information storage medium, by irradiating the first and second information storage media with light and for obtaining RF playback signals by irradiating the first and second information storage media with light and detecting light reflected therefrom;

a rotating mechanism for rotating the first and second information storage media;

a moving mechanism for moving the optical pickup in a radial direction of the first and second information storage media; and the optical disc controller of claim 10.

13. A method for controlling an optical disc drive that plays optically a first information storage medium and a second information storage medium having a higher storage density than that of the first information storage medium, the method comprising the steps of:

rotating the first and second information storage media;

removing first frequency range components from an RF playback signal, obtained by irradiating each of the first and second information storage media with light and detecting light reflected therefrom, and amplifying the amplitude of second frequency range components thereof; and generating a sync clock signal to do synchronization detection with respect to a digital playback signal that is obtained by digitizing the output of an equalizer, wherein the first and second information storage media are rotated so as to achieve a first transfer rate and a second transfer rate at which the maximum playback frequency of the RF playback signal obtained from the first information storage medium is substantially equal to that of the RF playback signal obtained from the second information storage medium.

14. The method of claim 13, wherein supposing channel clock frequencies of the first and second information storage media are A and B, respectively, the second transfer rate is n (where $1 \leqq n$) times as high as a standard transfer rate of the second information storage medium and the first transfer rate is $n \times (B/A)$ times as high as a standard transfer rate of the first information storage medium.

15. The method of claim 13, wherein the first and second information storage media are rotated at a constant linear velocity.

16. The method of claim 13, wherein the first and second information storage media are rotated at a constant angular velocity.

17. The method of claim 13, wherein the first and second frequency ranges are substantially equalized with each other at the first and second transfer rates.

18. The method of claim 13, wherein the same pair of setting constants is provided for a voltage controlled oscillator and a frequency divider, which are used to generate the sync clock signal, either at the first transfer rate or at the second transfer rate.

19. The method of claim 13, wherein a voltage controlled oscillator and a frequency divider are used to generate the sync clock signal and the frequency divider has an integral frequency division ratio.

20. The method of claim 13, wherein the optical disc drive also performs a write operation on the first and second information storage media, and wherein after a read or write operation has been performed on the first or second information storage medium for a predetermined period of time at a constant linear velocity for a first location in the radial direction while the first or second information storage medium is being rotated at a first rotation velocity so as to achieve a transfer rate that is higher than a standard read or write rate for the first or second information storage medium, a write or read operation is performed on the first or second information storage medium at the first rotation velocity and at a constant angular velocity for a second location.

21. The method of claim 20, wherein the second location is closer to the outer edge of the information storage medium than the first location is.

22. The method of claim 20, wherein the second location is closer to the inner edge of the information storage medium than the first location is, and wherein the transfer rate at the first location is at least 2.4 times as high as the standard transfer rate.

* * * * *

UNITED STATES PATENT AND TRADEMARK OFFICE
CERTIFICATE OF CORRECTION

PATENT NO. : 7,075,867 B2
APPLICATION NO. : 10/502674
DATED : July 11, 2006
INVENTOR(S) : Katsuya Watanabe et al.

It is certified that error appears in the above-identified patent and that said Letters Patent is hereby corrected as shown below:

Title Page, Item (54):

The title should read: -- OPTICAL DISC CONTROLLER AND OPTICAL DISC DRIVE INCLUDING THE SAME --.

Signed and Sealed this

Twenty-sixth Day of December, 2006

JON W. DUDAS
*Director of the United States Patent and Trademark Office*